(12) United States Patent
Honda et al.

(10) Patent No.: US 9,722,470 B2
(45) Date of Patent: Aug. 1, 2017

(54) CONNECTOR FOR ROTATING ELECTRIC MACHINE WITH CONDUCTOR, INSULATING LAYER, AND OUTER CONDUCTIVE LAYER FOR GROUNDING

(71) Applicant: ASMO CO., LTD., Kosai, Shizuoka-pref. (JP)

(72) Inventors: Tetsuya Honda, Kosai (JP); Akira Shiga, Kosai (JP); Kaname Egawa, Kosai (JP)

(73) Assignee: ASMO CO., LTD., Shizuoka-pref. (JP)

( * ) Notice: Subject to any disclaimer, the term of this patent is extended or adjusted under 35 U.S.C. 154(b) by 716 days.

(21) Appl. No.: 14/169,623

(22) Filed: Jan. 31, 2014

(65) Prior Publication Data
US 2014/0225464 A1    Aug. 14, 2014

(30) Foreign Application Priority Data

Feb. 12, 2013 (JP) ................... 2013-024772
Jul. 17, 2013 (JP) ................... 2013-148306
Dec. 19, 2013 (JP) ................... 2013-262521

(51) Int. Cl.
*H02K 5/24* (2006.01)
*H02K 11/02* (2016.01)
*H01R 4/64* (2006.01)
*H02K 5/22* (2006.01)
*H02K 11/026* (2016.01)
*H02K 11/40* (2016.01)

(52) U.S. Cl.
CPC ............... *H02K 5/24* (2013.01); *H01R 4/64* (2013.01); *H01R 4/646* (2013.01); *H02K 5/225* (2013.01); *H02K 11/026* (2013.01); *H02K 11/40* (2016.01); *H02K 11/02* (2013.01)

(58) Field of Classification Search
CPC ... H02K 5/225; H02K 5/24; H02K 5/14; H02K 5/15; H02K 11/40; H02K 11/02; H02K 5/16; H02K 11/026; H01R 4/64; H01R 4/646; H01R 9/0512
USPC ............................................. 310/71; 174/78
See application file for complete search history.

(56) References Cited

U.S. PATENT DOCUMENTS

| | | | |
|---|---|---|---|
| 3,440,592 A * | 4/1969 | Zelle ............... | H01R 23/10 310/71 |
| 4,533,784 A * | 8/1985 | Olyphant, Jr. ..... | H01B 13/2613 174/102 D |
| 4,851,730 A * | 7/1989 | Fushiya ............ | H02K 5/148 310/239 |
| 2002/0030414 A1* | 3/2002 | Mizutani ........... | H02K 11/026 310/51 |

(Continued)

*Primary Examiner* — Burton Mullins
*Assistant Examiner* — Alexander Singh
(74) *Attorney, Agent, or Firm* — Posz Law Group, PLC

(57) ABSTRACT

A rotating electric machine includes a rotation body driven to rotate, an accommodation body housing the rotation body, a first power-supply member electrically connected to a positive electrode of a power source, a second power-supply member electrically connected to a negative electrode of the power source, an insulation layer contacting outer peripheral surfaces of the first and second power-supply members, and a conductive layer contacting the insulation layer on an opposite side of the insulation layer from the outer peripheral surfaces of the first and second power-supply members. The conductive layer is electrically connected to the accommodation body.

17 Claims, 35 Drawing Sheets

(56) References Cited

U.S. PATENT DOCUMENTS

2009/0206694 A1* 8/2009 Kamiya ............... H01R 39/383
                                                          310/239
2012/0013226 A1 1/2012 Stubner et al.

* cited by examiner

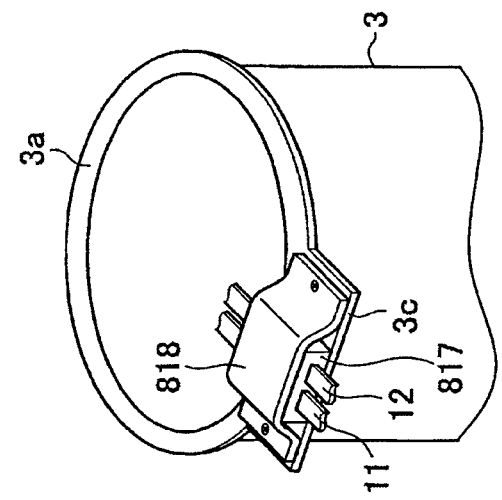
FIG. 38A  FIG. 38B  FIG. 38C
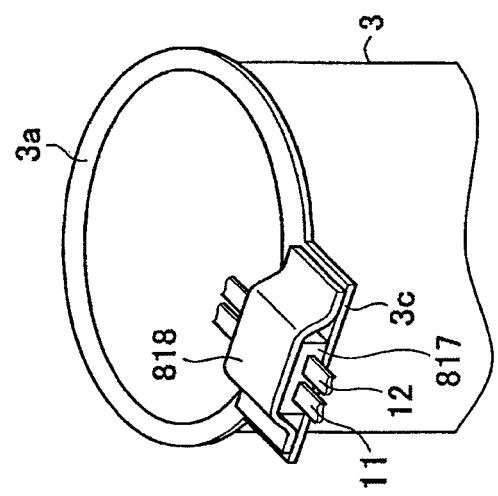
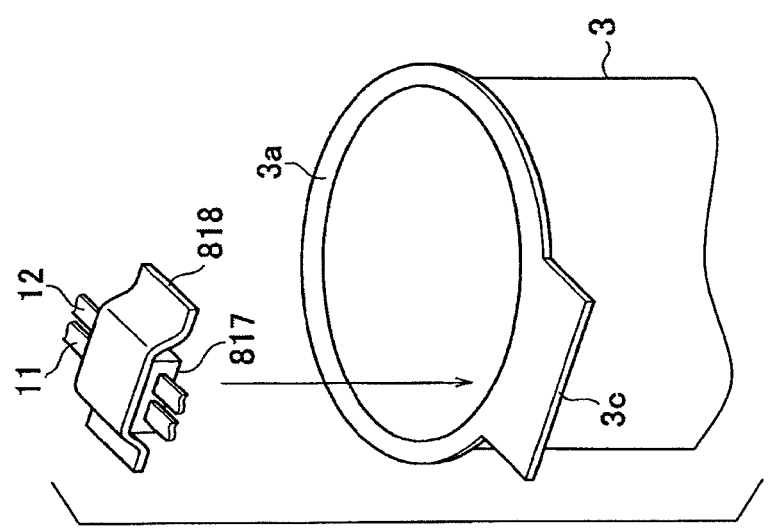

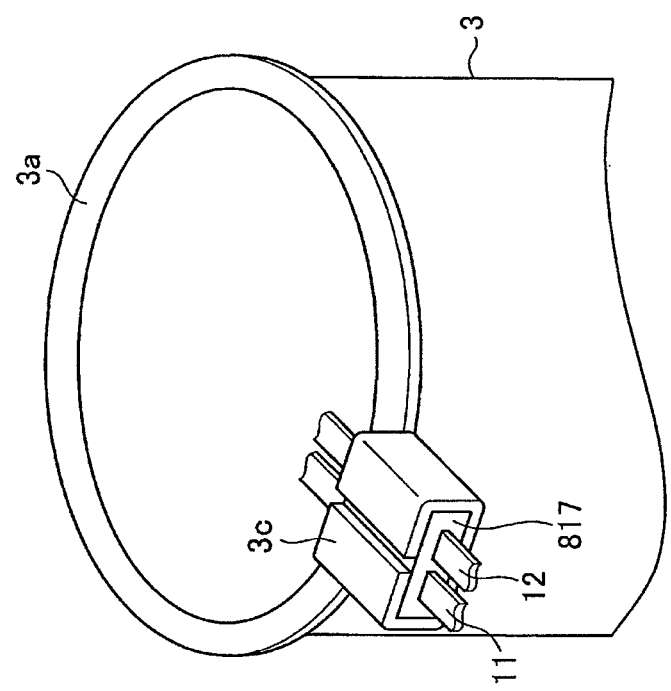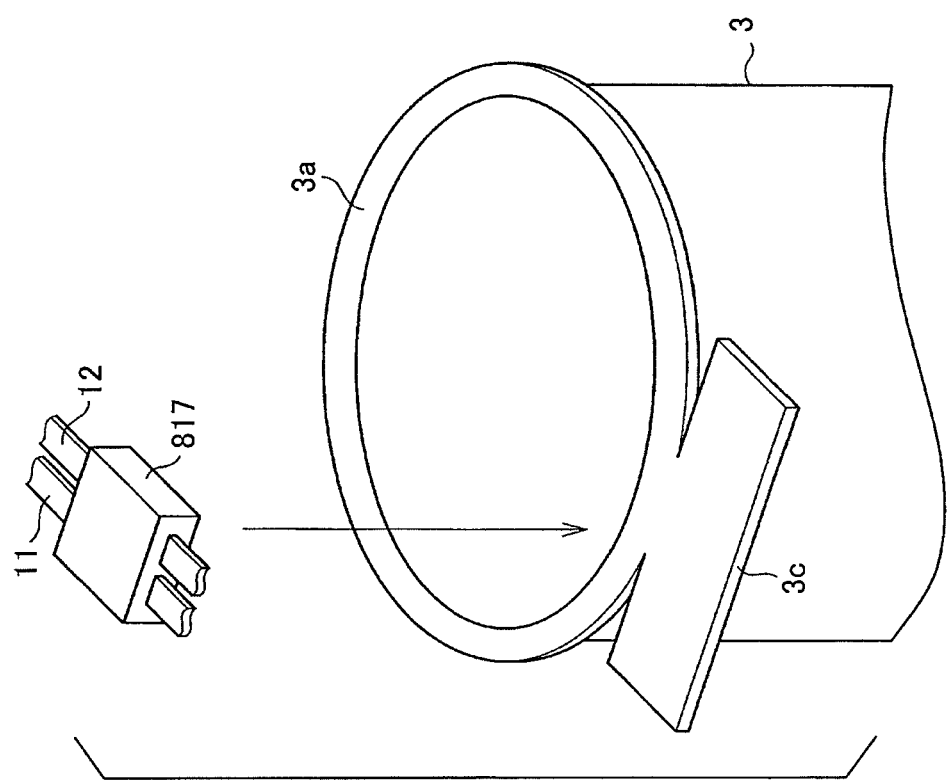

CONNECTOR FOR ROTATING ELECTRIC MACHINE WITH CONDUCTOR, INSULATING LAYER, AND OUTER CONDUCTIVE LAYER FOR GROUNDING

CROSS REFERENCE TO RELATED APPLICATION

This application is based on and incorporates herein by reference Japanese Patent Applications No. 2013-024772 filed on Feb. 12, 2013, No. 2013-148306 filed on Jul. 17, 2013, and No. 2013-262521 filed on Dec. 19, 2013.

TECHNICAL FIELD

The present disclosure relates to a rotating electric machine including a power-supply member connected to a power source and being capable of reducing electromagnetic noise.

BACKGROUND

When a rotating electric machine such as a brushed DC motor is operated, electromagnetic noise is generated due to sliding contact between a brush and a commutator. The noise is superimposed on, for example, a casing (motor yoke), a power-supply terminal and a wire harness which are provided in the rotating electric machine, and the noise may cause electromagnetic interference to peripheral equipments. Generally, a noise cancelling element such as a capacitor or a choke coil is provided in an electric circuit in order to reduce the noise and eliminate the electromagnetic interference to the peripheral equipments, for example, in Patent Document 1 (JP 2012-514966 A). In Patent Document 1, an inductor (choke coil) is arranged between a brush and an electric wire, and a capacitor is arranged between terminals of two brushes.

Such a noise reducing mechanism using the noise cancelling element is capable eliminating noise having a frequency lower than or equal to hundreds of MHz, but it may be difficult to eliminate noise having a frequency within a frequency range higher than hundreds of MHz. Accordingly, it may be difficult for the conventional noise reducing mechanism to eliminate the high-frequency noise. Thus, the high-frequency noise may transmit to a casing, a power-supply terminal and a wire harness sequentially, and may radiate in air. As a result, the high-frequency noise may cause electromagnetic interference to peripheral equipments.

SUMMARY

It is an objective of the present disclosure to provide a rotating electric machine having a relatively high reducing effect on a high-frequency noise.

According to an aspect of the present disclosure, a rotating electric machine includes a rotation body driven to rotate, an accommodation body housing the rotation body, a first power-supply member electrically connected to a positive electrode of a power source, a second power-supply member electrically connected to a negative electrode of the power source, an insulation layer contacting outer peripheral surfaces of the first and second power-supply members, and a conductive layer contacting the insulation layer on an opposite side of the insulation layer from the outer peripheral surfaces of the first and second power-supply members. The conductive layer is electrically connected to the accommodation body.

In the above-describe rotating electric machine, the insulation layer contacting the outer peripheral surface of each power-supply member and the conductive layer contacting the insulation layer work together to provide a capacitor, and the capacitor is capable of reducing high-frequency noise. Accordingly, enlarging of the rotating electric machine can be limited, and propagation of the high frequency noise can be restricted though the structure of the rotating electric machine is simple. Since the accommodation body is utilized as ground, further space reduction can be achieved as compared with a case in which an additional component is provided as ground.

Each of the first and second power-supply members may have a flat-plate shape having opposite flat surfaces. The insulation layer may be in contact with the flat surfaces of the outer peripheral surfaces of the first and second power-supply members. Accordingly, an area of a contact surface between the outer peripheral surface of each power-supply member and the insulation layer can be made to be relatively large. Therefore, the capacitance of the above-described capacitor can be increased.

Each of the first and second power-supply members may have an extending body. The extending body may include a first extending portion extending along an outer wall surface of the accommodation body, a bent portion located at an end of the first extending portion, and a second extending portion extending from the bent portion in a direction away from the accommodation body. The insulation layer and the conductive layer may cover at least the bent portion of the extending body. Accordingly, a portion of the conductive layer covering the bent portion is located near the outer wall surface of the accommodation body. Therefore, the connection of the conductive layer to the accommodation body can be facilitated.

The first power-supply member and the second power-supply member may be arranged adjacent to each other. A part of the insulation layer which contacts the outer peripheral surface of the first power-supply member may be connected to and be integrated with a part of the Insulation layer which contacts the outer peripheral surface of the second power-supply member. A part of the conductive layer which contacts the insulation layer opposite the outer peripheral surface of the first power-supply member may be connected to and be integrated with a part of the conductive layer which contacts the insulation layer opposite the outer peripheral surface of the second power-supply member. Accordingly, stiffness of the insulation layer and stiffness of the conductive layer can be increased. Moreover, there is no need to provide the insulation layer and the conductive layer to each power-supply members separately. Therefore, a manufacturing process of the rotating electric machine can be simplified.

The rotating electric machine may be adopted as a motor, and the motor may include a commutator attached to a rotor that is the rotation body, a brush slidably contacting the commutator, and a brush holder holding the brush and made of insulation resin. The brush may receive electricity from the power source through the first and second power-supply members, and the insulation layer may be a part of the brush holder. Accordingly, since a part of the brush holder is used as the insulation layer, the number of components can be reduced as compared with a case in which an insulation layer is provided additionally. Therefore, a manufacturing cost of the rotating electric machine can be reduced.

The conductive layer may be integrated with the brush holder and may be embedded in the brush holder. The first and second power-supply members may extend through the brush holder. The part of the brush holder that is the insulation layer may be interposed between each of the first and second power-supply members and the conductive layer inside the brush holder. In this case, the conductive layer and the brush holder are integrated and embedded in the brush holder. Therefore, the rotating electric machine including the above-described capacitor can be made to be compact, and the structure of the rotating electric machine can be simplified.

The accommodation body may include a yoke having an opening at one end of the yoke, and a lid body closing the opening of the yoke. The yoke may be made of a conductive material, and at least a part of the conductive layer may be a part of the yoke. Similarly, the accommodation body may include a yoke having an opening at one end of the yoke, and a lid body closing the opening of the yoke. The lid body may be made of a conductive material, and at least a part of the conductive layer may be a part of the lid body. In these cases, a part of the yoke or the lid body of the accommodation body is used as at least a part of the conductive layer. Thus, the above-described capacitor can be constituted by existing components. Therefore, increase in the number of components and change in size of the rotating electric machine can be limited.

In the above-described configuration, a part of the conductive layer may be a part of the yoke made of a conductive material, and the other part of the conductive layer may be a part of the lid body made of a conductive material. Accordingly, the limiting effect on the increase in the number of components and the change in size can be exerted more effectively.

The rotating electric machine may be adopted as a motor and may further include a motor holding member made of metal. The motor holding member may be attached to the accommodation body and be fixed at a predetermine position to keep an attachment state of the motor. The conductive layer may be a part of the motor holding member. Since a part of the motor holding member is used the conductive layer, the number of components can be reduced as compared with a case in which the conductive layer is provided additionally. Therefore, a manufacturing cost of the rotating electric machine can be limited.

At least one of the first or second power-supply member may include a power-supply member body and an enclosing portion that encloses the power-supply member body. The insulation layer may include a first insulation layer inside the enclosing portion and a second insulation layer outside the enclosing portion. The power-supply member body may have electric conductivity and may be in contact with the first insulation layer inside the enclosing portion. The enclosing portion may have electric conductivity and may be in contact with the second insulation layer opposite the power-supply member body. The conductive layer may include a first conductive layer contacting the first insulation layer opposite the power-supply member body, and a second conductive layer connected to the first conductive layer and contacting the second insulation layer opposite the enclosing portion. The second conductive layer may be electrically connected to the accommodation body. Since multiple numbers of the insulation layers and the conductive layers are provided adjacent to the power-supply members, the electrostatic capacitance of the above-described capacitor can be increased as compared with a case in which a single insulation layer and a single conductive layer are provided. Therefore, noise propagation can be limited within a wider frequency range.

The rotating electric machine may further include a laminated body, and the laminated body may include an insertion hole into which each of the first and second power-supply members is inserted, the insulation layer enclosing the insertion hole, and the conductive layer enclosing the insulation layer outside the insulation layer. The laminated body may be attached to each of the first and second power-supply members due to the insertion of the first and second power-supply members into the insertion hole. In this case, the laminated body including the insulation layer and the conductive layer is provided separately from the power-supply members, and the insulation layer and the conductive layer is provided to the power-supply members by attaching the power-supply members to the laminated body. Accordingly, for example, the insulation layer and the conductive layer can be attached to the power-supply members after the power-supply members are disposed in the rotating electric machine.

The insulation layer and the conductive layer may be in contact with each other, and one of the insulation layer or the conductive layer may be movable relative to the other of the insulation layer or the conductive layer. A position of the one of the insulation layer or the conductive layer may be switched by the relative motion between a position, where only the insulation layer exists between the conductive layer and each of the first and second power-supply members, and a position, where an air space exists in addition to the insulation layer between the conductive layer and each of the first and second power-supply members. In this case, existence or non-existence of the air space or a size of the air space between the conductive layer and the power-supply members can be adjusted by moving the one of the insulation layer or the conductive layer relative to the other of the insulation layer or the conductive layer. Accordingly, the electrostatic capacitance of the above-described capacitor can be adjusted, and a frequency range of noise that is an object to be reduced can be changed easily.

The insulation layer may include multiple regions different from each other in relative permittivity, and the multiple regions of the insulation layer may be arranged adjacent to each other along the conductive layer between the conductive layer and each of the first and second power-supply members. Since the insulation layer includes multiple regions different from each other in relative permittivity, the electrostatic capacitance of the above-described capacitor changes depending on the relative permittivity of each region. Therefore, the electrostatic capacitance of the capacitor can be adjusted by adjustment of the relative permittivity in each region of the insulation layer, and a frequency range of noise that is an object to be reduced can be changed easily.

Both the insulation layer and the conductive layer may be provided along the outer peripheral surface of each of the first and second power-supply members. At least one of the insulation layer or the conductive layer may be discontinuous in a circumferential direction of the outer peripheral surface of each of the first and second power-supply members.

Each of the first and second power-supply members, the insulation layer and the conductive layer constitute a capacitor to reduce noise, and an electrostatic capacitance of the capacitor may be larger than or equal to 5 pF. In this case, high-frequency noise within a frequency range from 142 to 1494 MHz can be reduced effectively.

According to the rotating electric machine of the present disclosure, the insulation layer contacting the outer peripheral surfaces of the power-supply members and the conductive layer contacting the insulation layer work together to provide a capacitor and limit propagation of high-frequency noise. Therefore, enlarging of the rotating electric machine can be limited, and the propagation of high-frequency noise can be restricted by a simple structure of the rotating electric machine. Furthermore, the insulation layer and the conductive layer may be constituted by an existing component of the rotating electric machine. Therefore, increase in the number of components and change in size caused by attachment of the insulation layer or the conductive layer can be limited.

BRIEF DESCRIPTION OF THE DRAWINGS

The disclosure, together with additional objectives, features and advantages thereof, will be best understood from the following description, the appended claims and the accompanying drawings, in which:

FIG. 38A is a diagram showing power-supply terminals and a motor yoke, according to a twenty-third modification example of the exemplar embodiment;

FIG. 38B is a diagram showing the power-supply terminals attached to the motor yoke by welding, according to the twenty-third modification example;

FIG. 38C is a diagram showing the power-supply terminals attached to the motor yoke by using screws, according to the twenty-third modification example;

FIG. 39A is a diagram showing power-supply terminals and a motor yoke, according to a twenty-fourth modification example of the exemplar embodiment;

FIG. 39B is a diagram showing the power-supply terminals attached to the motor yoke, according to the twenty-fourth modification example;

DETAILED DESCRIPTION

A motor 1 of an exemplar embodiment will be described as an example of a rotating electric machine with reference to the drawings. The exemplar embodiment is utilized to facilitate understanding of the present disclosure. The exemplar embodiment is just an example and does not limit the present disclosure. The present disclosure can be modified and improved without departing from the scope of the present disclosure. The present disclosure includes equivalents of the present disclosure.

Figure 1:
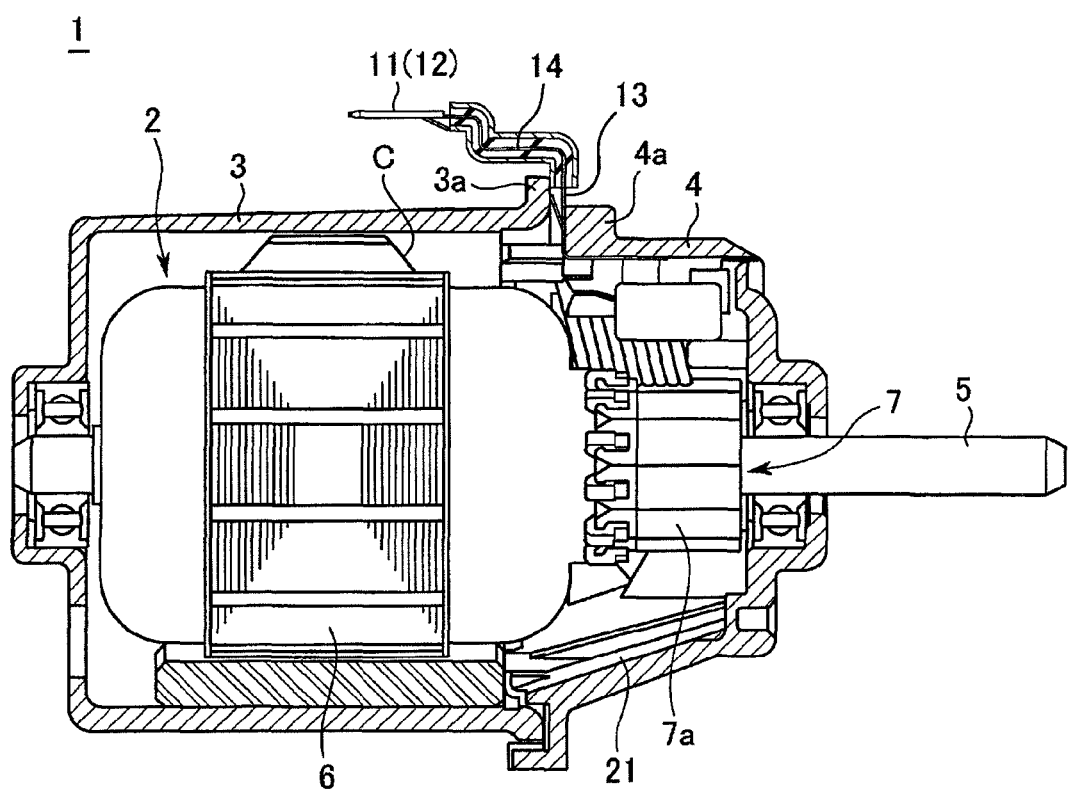
FIG. 1 is a diagram showing a motor according to an exemplar embodiment of the present disclosure.

The motor 1 is a brushed DC motor and employs a known configuration except for power-supply terminals 11 and 12 described later. As shown in FIG. 1, the motor 1 includes an armature 2 as a rotor that is driven to rotate. The armature 2 includes a rotary shaft 5, a core 6 around which a wire C has been wound, and a commutator 7 consisting of multiple segments 7a arranged in a rotational direction of the motor 1. The armature 2 is an example of a rotation body that is driven to rotate.

The armature 2 is housed in a motor yoke 3 having a bottomed cylindrical shape. The rotary shaft 5 of the armature 2 extends through an end plate 4 attached to an opening end of the motor yoke 3. The end plate 4 has a lid shape. Therefore, the motor yoke 3 and the end plate 4 may be used as an example of an accommodation body that houses the armature 2. The motor yoke 3 and the end plate 4 are combined and integrated with each other by a known method. The motor yoke 3 may be used as an example of a yoke having an opening at one end of the yoke. The end plate 4 may be used as an example of a lid body closing the opening of the yoke.

Figure 2:
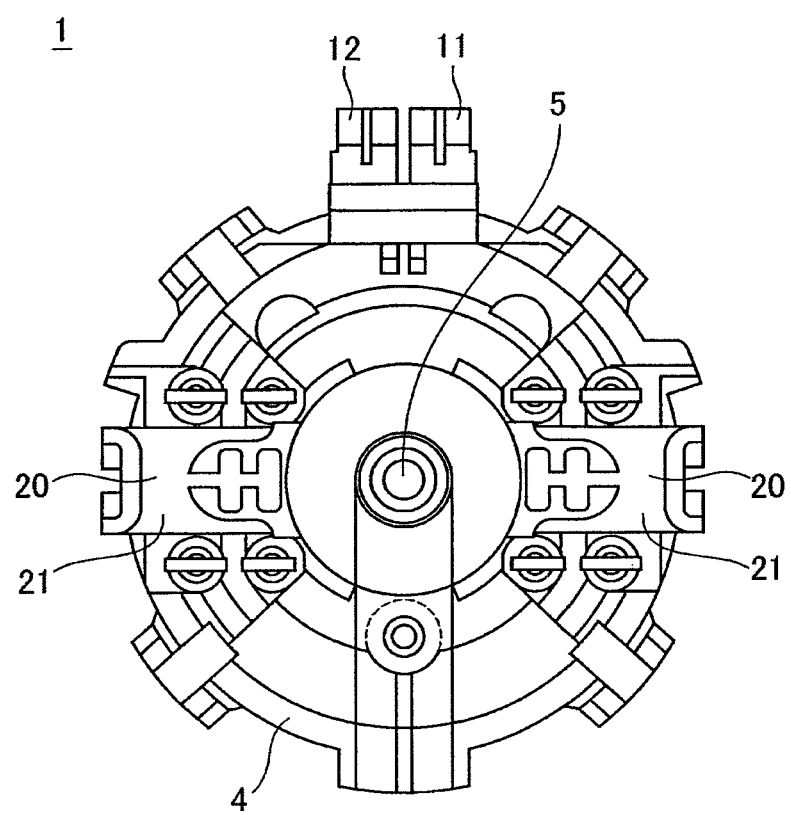
FIG. 2 is a front view showing a brush holder of the motor according to the exemplar embodiment.
Figure 5:
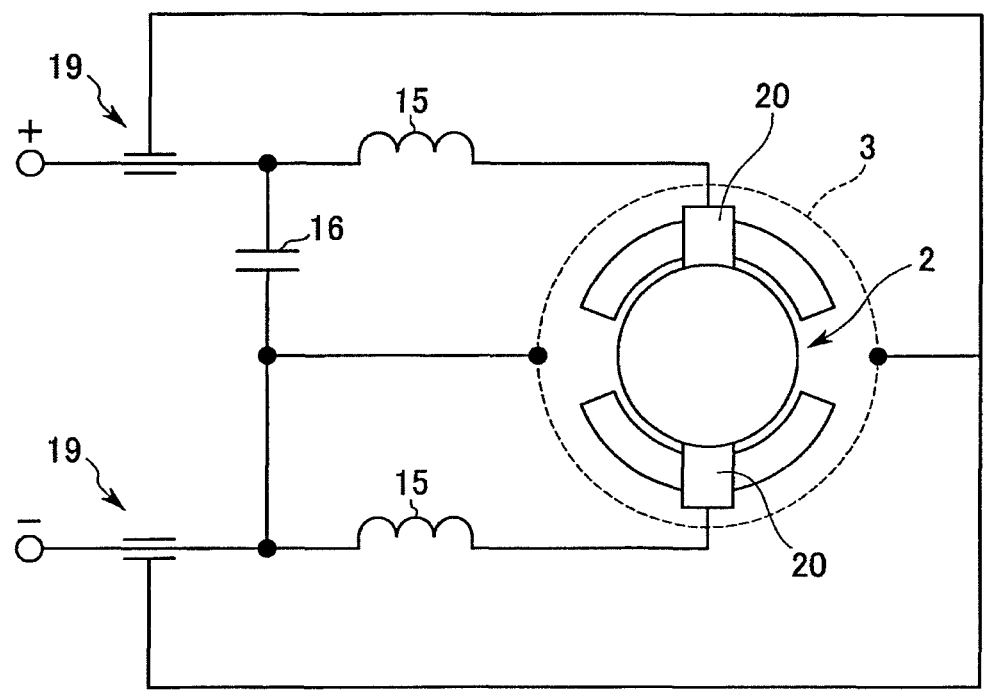
FIG. 5 is a diagram showing an electric circuit of the motor according to the exemplar embodiment.

As shown in FIGS. 1 and 2, a brush holder 21 is provided on an inner side of the end plate 4 and holds a brush 20 shown in FIGS. 2 and 5. In the exemplar embodiment, the brush holder 21 is made of resin having insulation properties. The number of the brush holders 21 is two in the exemplar embodiment, and the brush holders 21 are arranged separately from each other by 180 degrees in the rotational direction. The brush holders 21 of the present embodiment have known shapes or known structures. The brushes 20 slidably contact the multiple segments 7a of the commutator 7 of the armature 2. The structure of the brush 20 is the same as a known structure generally employed to a brushed DC motor.

As shown in FIGS. 1 and 2, attached to the end plate 4 are the first power-supply terminal 11 and the second power-supply terminal 12. In the present embodiment, as shown in FIG. 2, the first power-supply terminal 11 and the second power-supply terminal 12 are located at the approximately same position in the rotational direction and are located adjacent to each other in the rotational direction. When the first power-supply terminal 11 and the second power-supply terminal 12 are electrically connected to corresponding electrodes of a vehicular power source (e.g., 12 V), electricity can be supplied to the brushes 20 held by the brush holders 21.

The first power-supply terminal 11 is a flat-plate-like member that is to be connected to a positive electrode of a non-shown power source. The first power-supply terminal 11 is configured not to move due to vibration and is electrically connected to one of the brushes 20 through a pigtail wire 22 shown in FIG. 3. The first power-supply terminal 11 of the present embodiment is provided by (i) stamping out a thin conductive metallic plate into a predetermined shape and (ii) bending the plate into a step-like shape shown in FIG. 3. The first power-supply terminal 11 may be used as an example of a first power-supply member electrically connected to a positive electrode of a power source.

The second power-supply terminal 12 is a flat-plate-like member that is to be connected to a negative electrode of the non-shown power source. The second power-supply terminal 12 is configured not to move due to vibration and is electrically connected to the other of the brushes 20 through a pigtail wire 22 shown in FIG. 3. The second power-supply terminal 12 is similar to the first power-supply terminal 11 in configuration and shape. Therefore, only the configuration and shape of the second power-supply terminal 12 will be described unless otherwise noted. The first power-supply terminal 11 may be used as an example of a first power-supply member electrically connected to a positive electrode of a power source. The second power-supply terminal 12 may be used as an example of a second power-supply member electrically connected to a negative electrode of a power source.

Figure 3:
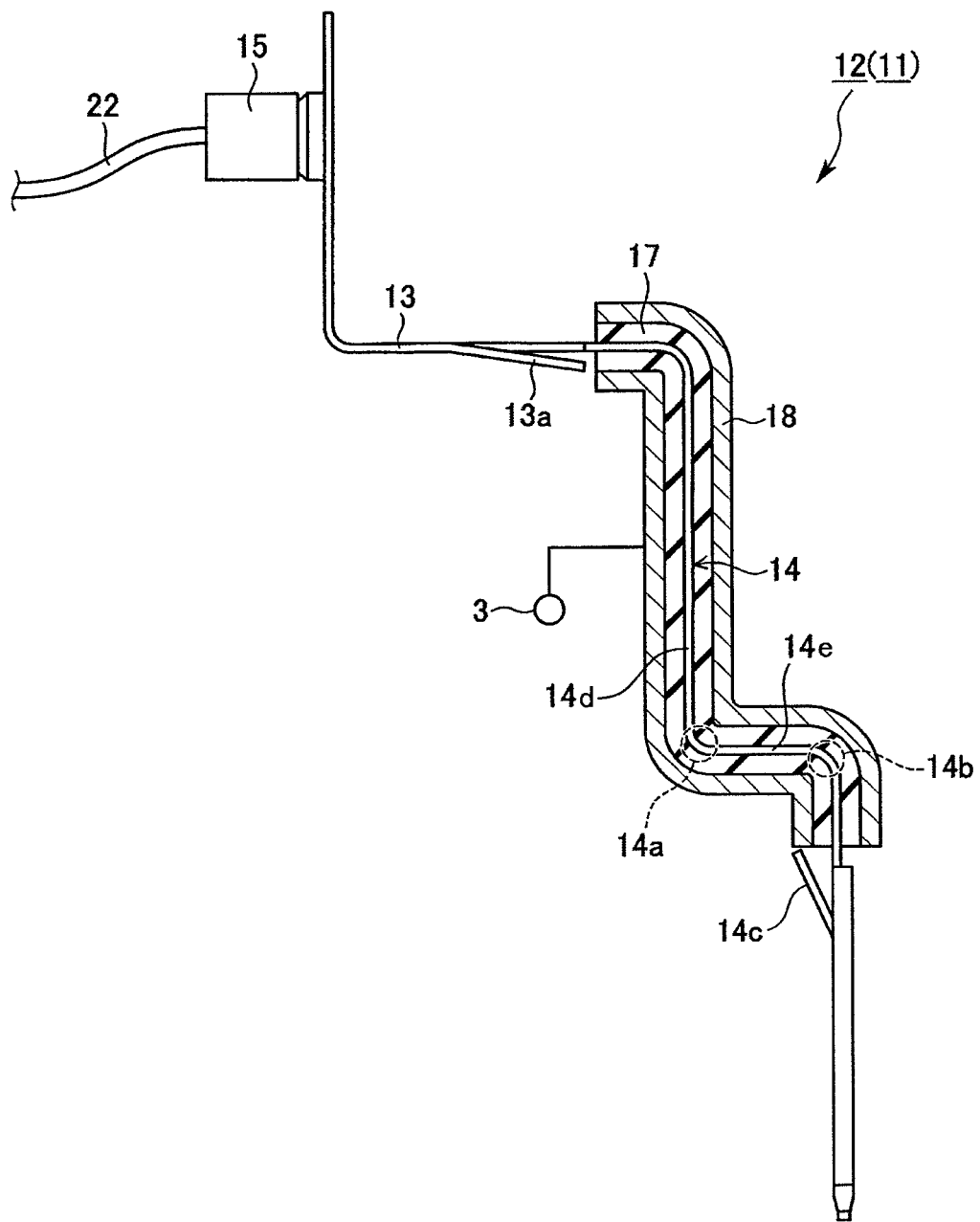
FIG. 3 is a schematic sectional diagram showing a power-supply terminal according to the exemplar embodiment.

As shown in FIG. 3, the second power-supply terminal 12 includes an opposing portion 13. The opposing portion 13 is opposed to a flange 4a provided on an opening side of the end plate 4 in a state where the second power-supply terminal 12 is attached to the end plate 4. The second power-supply terminal 12 further includes an extending body 14 extending from an end of the opposing portion 13 in a predetermined direction perpendicular to the opposing portion 13.

As shown in FIG. 1, the opposing portion 13 is interposed between the flange 4a provided on the opening side of the end plate 4 and a flange 3a provided on an opening side of the motor yoke 3 when manufacturing of the motor 1 is finished. The opposing portion 13 has a claw-like elastic contact part 13a in a middle part of the opposing portion 13 in an extending direction of the opposing portion 13. The elastic contact part 13a is formed by cutting a part of the opposing portion 13 and raising the cut part from the opposing portion 13. The elastic contact part 13a contacts and presses the flange 3a with deforming elastically when the manufacturing of the motor 1 is finished.

The elastic contact part 13a may be provided in at least the second power-supply terminal 12. The elastic contact part 13a may not be provided in the first power-supply terminal 11.

The extending body 14 includes a first extending portion 14d extending along an outer wall surface of the motor yoke 3 when the manufacturing of the motor 1 is completed. Additionally, the extending body 14 includes multiple bent portions where the extending body 14 is bent at an approximately right angle. More specifically, the extending body 14 includes a first bent portion 14a located at an end of the first extending portion 14d, a second extending portion 14e extending in a direction away from the outer wall surface of the motor yoke 3, and a second bent portion 14b located at an end of the second extending portion 14e opposite the first bent portion 14a. The extending body 14 is bent at an approximately right angle at a second bent portion 14b and extends along the outer wall surface of the motor yoke 3. Since the first and second bent portions 14a and 14b are provided, the extending body 14 can be made to be nearer to the outer wall surface of the motor yoke 3, as shown in FIG. 1, than a case in which the first and second bent portions 14a and 14b are not provided.

The extending body 14 has a locking portion 14c protruding toward the motor yoke 3. The locking portion 14c is located at a position somewhat away from an end (free end) of the extending body 14 toward a base end of the extending body 14. The locking portion 14c prevents the second power-supply terminal 12 from dropping out when the second power-supply terminal 12 is inserted into a non-shown connector for connection to a power source.

The second power-supply terminal 12 is connected to the brush 20 through the pigtail wire 22 as described above. More specifically, as shown in FIG. 5, a choke coil 15 for reducing electromagnetic noise is arranged in series between the second power-supply terminal 12 and the pigtail wire 22. Similarly, a choke coil 15 is arranged in series between the first power-supply terminal 11 and the pigtail wire 22.

Moreover, in the electrical circuit of the motor 1, a capacitor 16 is arranged in parallel as another element for reducing noise. One of two terminals of the capacitor 16 is connected to a terminal of the choke coil 15 coupled with the first power-supply terminal 11, and the other of two terminals of the capacitor 16 is connected to a terminal of the choke coil 15 coupled with the second power-supply terminal 12.

A wire between the capacitor 16 and the choke coil 15 coupled with the second power-supply terminal 12 is in contact with the outer wall surface of the motor yoke 3. The second power-supply terminal 12 is, as described above, connected to the negative electrode of the power source.

Figure 45:
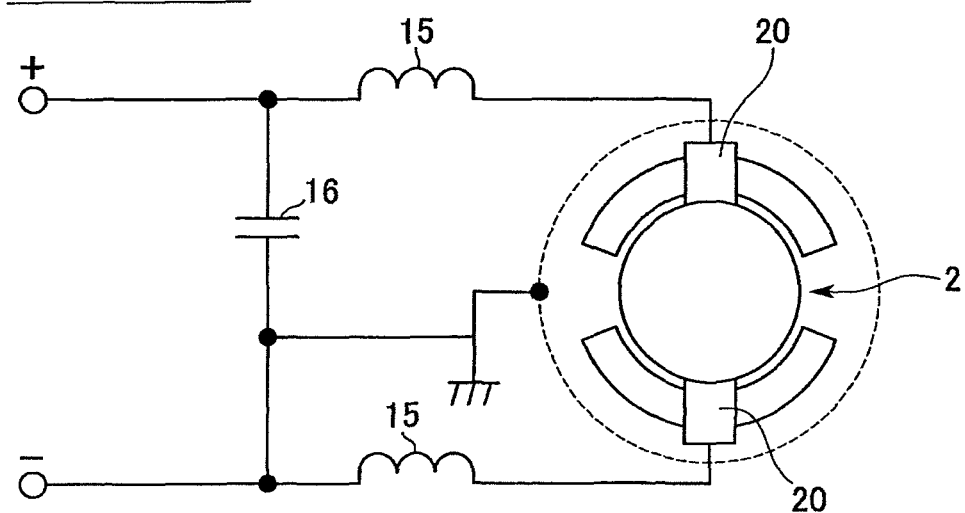
FIG. 45 is a diagram showing an electric circuit according a comparative example of the present disclosure.

A configuration for reducing noise of the above-described configuration, i.e. the electrical circuit of the motor 1 has things in common with a comparative electrical circuit shown in FIG. 45 for the most part. However, it is difficult to remove noise including high frequency range in the comparative electrical circuit shown in FIG. 45. High-frequency noise may transmit to the motor yoke 3, the power-supply terminals 11 and 12, and wire harnesses in waves. The high-frequency noise may propagate through air during the transmitting. As a result, the high-frequency noise may cause electromagnetic interference to equipments around the motor.

The motor 1 of the present embodiment has a configuration capable of removing the high-frequency noise. Thus, electromagnetic interference due to the high-frequency noise can be prevented. The configuration adopted for the motor 1 for removing the high-frequency noise will be described below.

Figure 4:
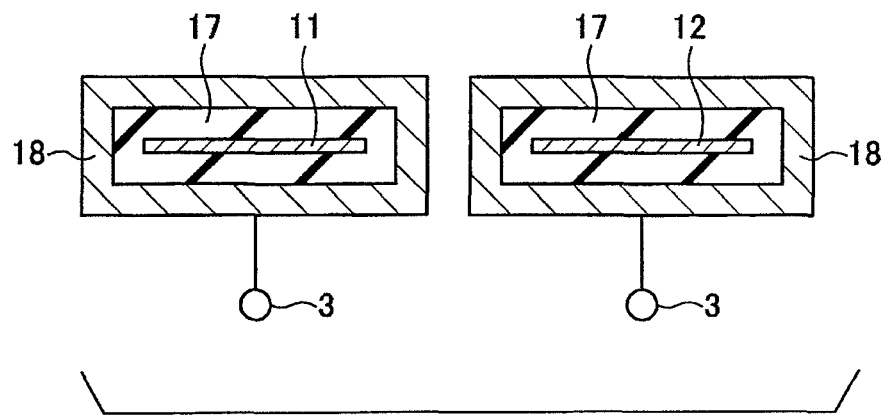
FIG. 4 is a schematic sectional diagram showing power-supply terminals according to the exemplar embodiment.

Both the first power-supply terminal 11 and the second power-supply terminal 12 of the motor 1 include an insulation layer 17 and a frame conductive layer 18 shown in FIGS. 3 and 4. The insulation layer 17 and the frame conductive layer 18 of the first power-supply terminal 11 are made of the same material and have the same shape as those of the second power-supply terminal 12. The insulation layer 17 is located adjacent to an outer peripheral surface of each power-supply terminal 11 or 12 in a connected state where each power-supply terminal 11 or 12 is connected to the power source. More specifically, the insulation layer 17 is formed so as to enclose each power-supply terminal 11 or 12 and is in contact with the outer peripheral surface of each power-supply terminal 11 or 12. The outer peripheral surface of each power-supply terminal 11 or 12 does not move by vibration and consists of four flat surfaces as shown in FIG. 4. Hence, the insulation layer 17 is formed to be in contact with the four flat surfaces of the outer peripheral surface of each power-supply terminal 11 or 12.

In the present embodiment, as shown in FIG. 4, the insulation layers 17 are provided separately to the first power-supply terminal 11 and the second power-supply terminal 12. The insulation layer 17 of the first power-supply terminal 11 is the same as the insulation layer 17 of the second power-supply terminal 12 in material and shape. For example, a material for the insulation layer 17 may be a dielectric resin (e.g., phenol, polypropylene, nylon, or polyester).

The frame conductive layer 18 is located adjacent to the insulation layer 17 on an opposite side of the insulation layer 17 from the outer peripheral surface of each power-supply terminal 11 or 12 in the connected state. Similar to the insulation layers 17, the frame conductive layers 18 are formed separately for the first power-supply terminal 11 and the second power-supply terminal 12.

As shown in FIGS. 3 and 4, the insulation layer 17 made of Insulation resin is formed to cover the extending body 14 of each power-supply terminal 11 or 12 except for an end portion of the extending body 14. The frame conductive layer 18 made of metal or conductive resin is formed to enclose an entire region where the insulation layer 17 is formed. An area of the first power-supply terminal 11 which is opposed to the frame conductive layer 18 is the same as that of the second power-supply terminal 12. Moreover, a distance (opposed distance) between the first power-supply terminal 11 and the frame conductive layer 18 is the same as an opposed distance between the second power-supply terminal 12 and the frame conductive layer 18.

The frame conductive layer 18 of each power-supply terminal 11 or 12 is, as shown in FIGS. 3 to 5, in contact partially with the outer peripheral surface of the motor yoke 3. Therefore, the frame conductive layer 18 of each power-supply terminal 11 or 12 is electrically connected to the outer peripheral surface of the motor yoke 3.

In the present embodiment, the above-described insulation layer 17 is formed on a predetermined region of each power-supply terminal 11 or 12 by insert molding. In the present embodiment, the frame conductive layer 18 is formed by, for example, metallic plating or pasting a metallic tape on a surface of the insulation layer 17 that is formed to cover the predetermined region of each power-supply terminal 11 or 12.

Since the insulation layer 17 and the frame conductive layer 18 are formed as described above, the first power-supply terminal 11 and the second power-supply terminal 12 function as capacitors having relatively potent reducing effect on the high-frequency noise. In other words, as shown in FIG. 5, a tubular capacitor 19 having a frame structure is provided in each power-supply terminal 11 or 12 by forming the insulation layer 17 and the frame conductive layer 18. Consequently, even when high-frequency noise occurs in the motor 1, the high-frequency noise can be eliminated by the above-described tubular capacitor 19 at the time of transmission of the noise superimposed on the motor yoke 3 to each power-supply terminal 11 or 12.

Accordingly, the size of motor can be made to be relatively small, and transmission of high-frequency noise can be limited by a simple configuration, in comparison with a configuration in which, for example, an additional capacitor is provided for removing the high-frequency noise.

Figure 6:
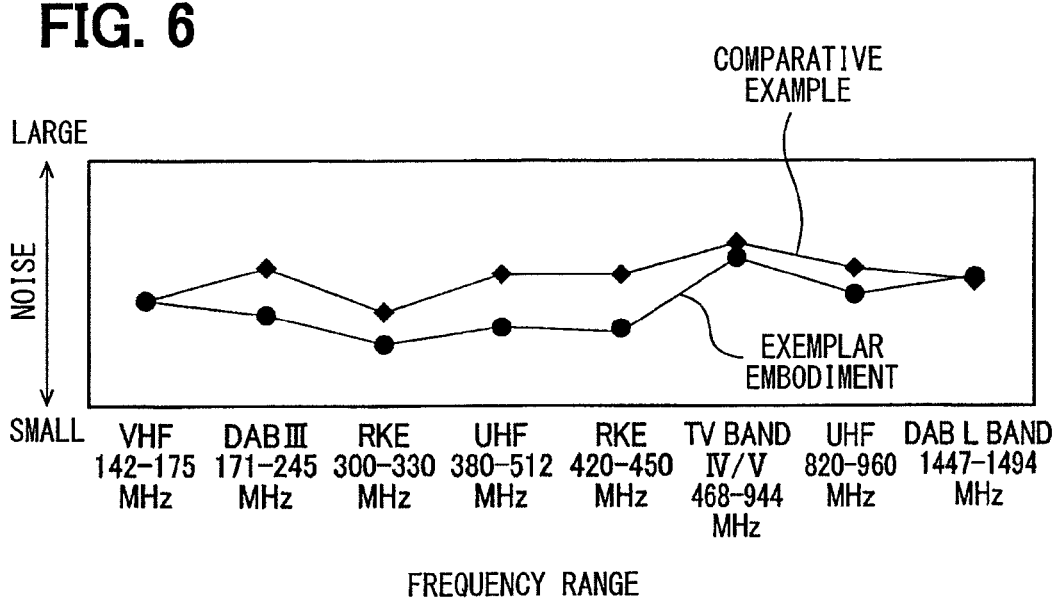
FIG. 6 is a diagram showing a reducing effect of the motor of the exemplar embodiment on high-frequency noise by comparison between the exemplar embodiment and a comparative example of the present disclosure.

The reducing effect on high-frequency noise in the motor 1 to which the present disclosure is applied will be described. As shown in FIG. 6, a reduction ratio of noise within a frequency range from 142 MHz to 1494 MHz is high in the motor 1 of the present embodiment in comparison with a comparative motor that is not provided with the insulation layer 17 and the frame conductive layer 18. FIG. 6 is a diagram showing the reducing effect on the high-frequency noise in the motor 1 of the present embodiment. In FIG. 6, the horizontal axis represents a frequency range, and the vertical axis represents magnitude of noise.

Figure 7:
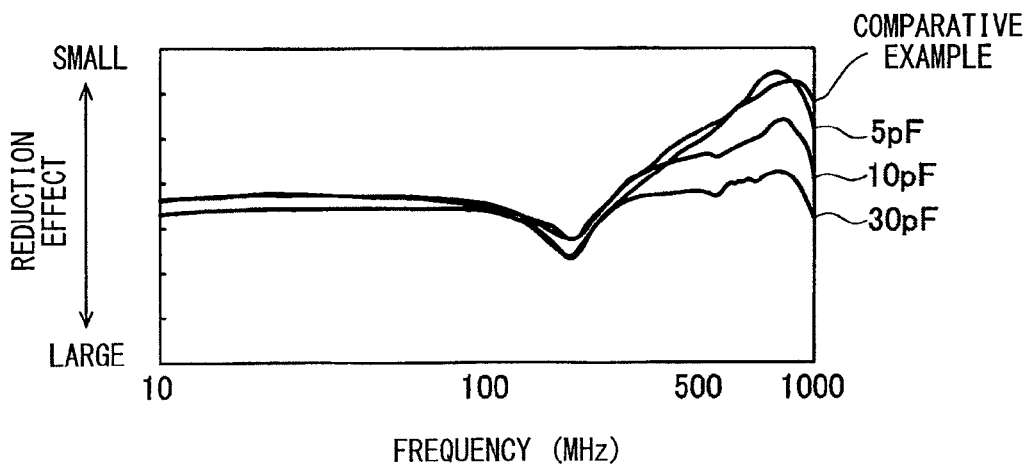
FIG. 7 is a diagram showing a relationship between a capacitance of a capacitor and a reducing effect on noise.

The reducing effect on noise is dependent on an electrostatic capacitance of the tubular capacitor 19 provided in each power-supply terminal 11 or 12. As shown in FIG. 7, the more the electrostatic capacitance of the tubular capacitor 19 is, the more potent reducing effect on noise can be obtained. FIG. 7 is a diagram showing a relationship between the electrostatic capacitance and the noise reducing effect. In FIG. 7, the horizontal axis represents frequency, and the vertical axis represents a degree of the reducing effect. Therefore, the tubular capacitor 19 preferably has a larger capacitance. The electrostatic capacitance of the tubular capacitor 19 may be larger than 5 pF or may be larger than or equal to 10 pF. In the motor 1 of the present embodiment, the electrostatic capacitance of the tubular capacitor 19 is set at 30 pF.

Figure 8:
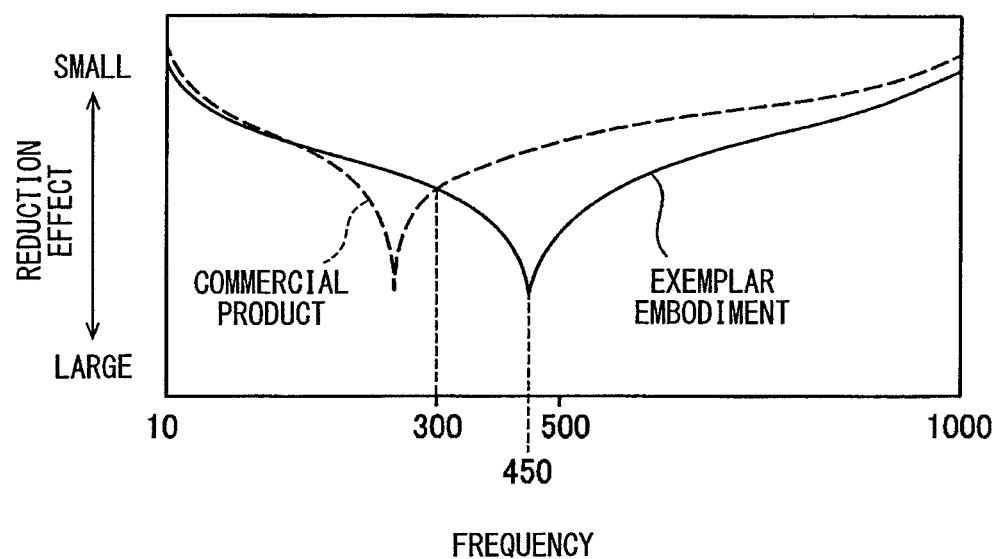
FIG. 8 is a diagram showing comparison of a reducing effect on noise between the motor of the exemplar embodiment and a commercially available capacitor.

The tubular capacitor 19 of the motor 1 is capable of reducing higher frequency noise as compared to a commercially available capacitor (leaded ceramic capacitor) having the same degree of electrostatic capacitance as the tubular capacitor 19. As shown in FIG. 8, the tubular capacitor 19 of the motor 1 is capable of effectively eliminating noise within a frequency range more than or equal to 300 MHz, particularly around 450 MHz. The noise within the frequency range more than or equal to 300 MHz is difficult to be eliminated by using the commonly available capacitor. FIG. 8 is a comparison diagram showing the reducing effect on high-frequency noise in the motor 1 of the present embodiment and the reducing effect of the commercially available capacitor. In FIG. 8, the horizontal axis represents frequency, and the vertical axis represents a degree of the reducing effect on noise.

Next, the power-supply terminals 11 and 12, the insulation layer 17 and the frame conductive layer 18 will be described in detail. In the above-describe embodiment, each power-supply terminal 11 or 12 is the flat-plate-like member, and the insulation layer 17 is formed to enclose each power-supply terminal 11 or 12. In other words, the insulation layer 17 is in contact with the four flat surfaces of the outer peripheral surface of each power-supply terminal 11 or 12 in the connected state. The frame conductive layer 18 is formed to enclose the insulation layer 17. The frame conductive layer 18 is in contact with a surface of the insulation layer 17 provided on a side of the insulation layer 17 opposed to the frame conductive layer 18. In other words, the frame conductive layer 18 is in contact with the surface of the insulation layer 17 opposite each power-supply terminal 11 or 12. According to the above-described configuration, a contact surface area between the outer peripheral surface of each power-supply terminal 11 or 12 and the insulation layer 17 can be made to be relatively large. As a result, the electrostatic capacitance of the tubular capacitor 19 can be made to be large with relative ease.

Although the present disclosure has been fully described in connection with the exemplar embodiment thereof with reference to the accompanying drawings, it is to be noted that various changes and modifications described below will become apparent to those skilled in the art.

Figure 9A:
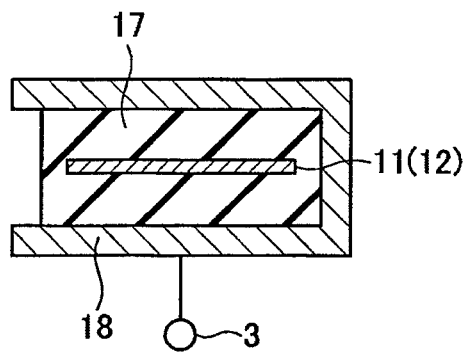
FIG. 9A is a diagram showing an example of a configuration in which a frame conductive layer is discontinuous in a circumferential direction of the power-supply terminal, according to a first modification example of the exemplar embodiment.
Figure 9B:
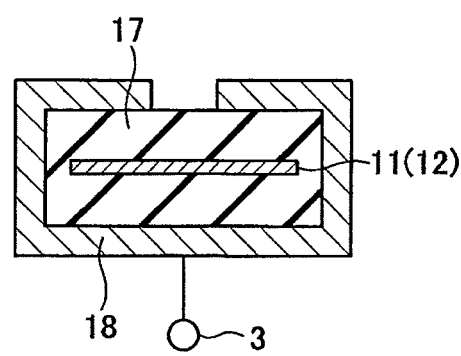
FIG. 9B is a diagram showing another example of the configuration in which the frame conductive layer is discontinuous in the circumferential direction of the power-supply terminal, according to the first modification example.
Figure 9C:
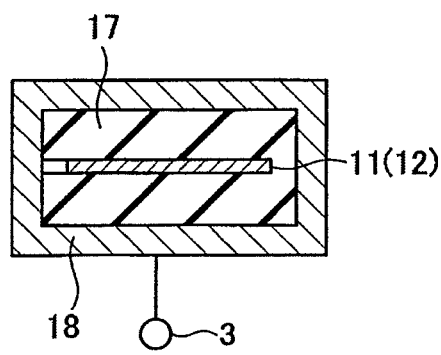
FIG. 9C is a diagram showing an example of a configuration in which an insulation layer is discontinuous in the circumferential direction of the power-supply terminal, according to the first modification example.
Figure 9D:
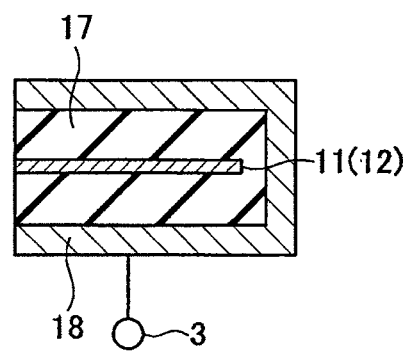
FIG. 9D is a diagram showing an example of a configuration in which both the frame conductive layer and the insulation layer are discontinuous in the circumferential direction of the power-supply terminal, according to the first modification example.
Figure 9E:
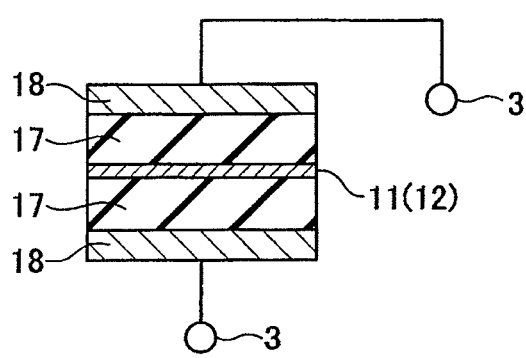
FIG. 9E is a diagram showing another example of the configuration in which both the frame conductive layer and the insulation layer are discontinuous in the circumferential direction of the power-supply terminal, according to the first modification example.

In the above-described embodiment, both the insulation layer 17 and the frame conductive layer 18 are provided along the outer peripheral surface of each power-supply terminal 11 or 12 and continuously extend in a circumferential direction of the outer peripheral surface of each power-supply terminal 11 or 12. However, the shapes of the insulation layer 17 and the frame conductive layer 18 are not limited to the above. As shown in FIGS. 9A to 9E, at least one of the insulation layer 17 or the frame conductive layer 18 may be formed to be discontinuous in the circumferential direction of the outer peripheral surface of each power-supply terminal 11 or 12. In FIGS. 9A and 9B, the frame conductive layer 18 is formed partially on the insulation layer 17. In FIG. 9C, the insulation layer 17 is formed partially on the outer peripheral surface of each power-supply terminal 11 or 12. In FIGS. 9D and 9E, both the insulation layer 17 and the frame conductive layer 18 are formed partially on the outer peripheral surface of each power-supply terminal 11 or 12.

In the above-described embodiment, the extending body 14 of each power-supply terminal 11 or 12 has the first bent portion 14a and the second bent portion 14b. As shown in FIG. 3, both the insulation layer 17 and the frame conductive layer 18 cover both the first bent portion 14a and the second bent portion 14b.

Since the extending body 14 of each power-supply terminal 11 or 12 has the first and second bent portions 14a and 14b, the extending body 14 can be located to be nearer to the outer wall surface of the motor yoke 3. Accordingly, the frame conductive layer 18 provided to each power-supply terminal 11 or 12 can be easily made to be in contact with the outer wall surface of the motor yoke 3. Therefore, the above-describe tubular capacitor 19 can be easily provided.

Figure 10:
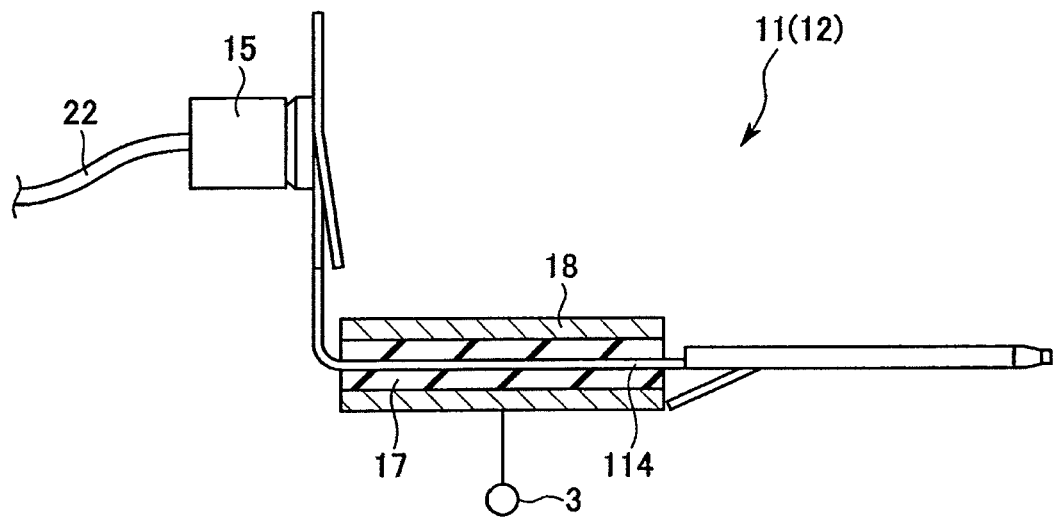
FIG. 10 is a diagram showing a power-supply terminal according to a second modification example of the exemplar embodiment.

Each power-supply terminal 11 or 12 is not limited to include the extending body 14 having the first bent portion 14a. As shown in FIG. 10, each power-supply terminal 11 or 12 may include an extending portion 114 that extends straight along the outer wall surface of the motor yoke 3 without having a bent portion such as the first bent portion 14a. The shape of each power-supply terminal 11 or 12 is not limited to the shape shown in FIG. 3 or 10 and may be, for example, a circular shape or an R shape in a lateral view.

Figure 11A:
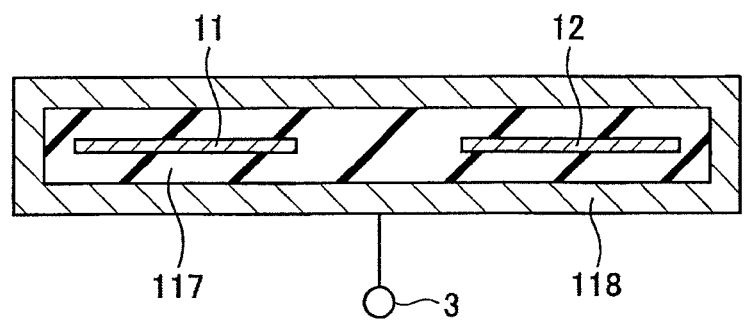
FIG. 11A is a schematic sectional diagram showing a power-supply terminal according to a third modification example of the exemplar embodiment.

In the above-described embodiment, the first and second power-supply terminals 11 and 12 individually have the insulation layer 17 and the frame conductive layer 18. In other words, as shown in FIG. 4, the insulation layer 17 and the frame conductive layer 18 of the first power-supply terminal 11 are kept away from the insulation layer 17 and the frame conductive layer 18 of the second power-supply terminal 12. However, the insulation layer 17 and the frame conductive layer 18 are not limited to this. As shown in FIG. 11A, an insulation layer 117 may be formed on the first and second power-supply terminals 11 and 12, and the first and second power-supply terminals 11 and 12 may be integrated via the insulation layer 117. A frame conductive layer 118 may be provided on an outer surface of the insulation layer 117 as shown in FIG. 11A. In this case, stiffness of the insulation layer 117 and stiffness of the frame conductive layer 118 are higher than stiffness of the insulation layer 17 and stiffness of the frame conductive layer 18 of the above-described embodiment, respectively. Additionally, there is no need to provide the insulation layer 117 and the frame conductive layer 118 to each power-supply terminal 11 or 12 individually. Therefore, a manufacturing process of the motor 1 can be simplified. This configuration, in which the first and second power-supply terminals 11 and 12 are integrated by forming the Insulation layer 17 and the frame conductive layer 18 as shown in FIG. 11A, can be provided by forming the respective components with dimensions shown in FIG. 1B.

In the above-described embodiment, the insulation layer 17 is formed on and covers the predetermined region of each power-supply terminal 11 or 12 by insert molding, for example. On the other hand, when a part of an existing component of the motor 1 is used as the insulation layer 17, the number of components can be reduced as compared with a configuration in which the insulation layer 17 is provided additionally as in the above-described embodiment. Therefore, a manufacturing cost can be reduced.

Figure 12:
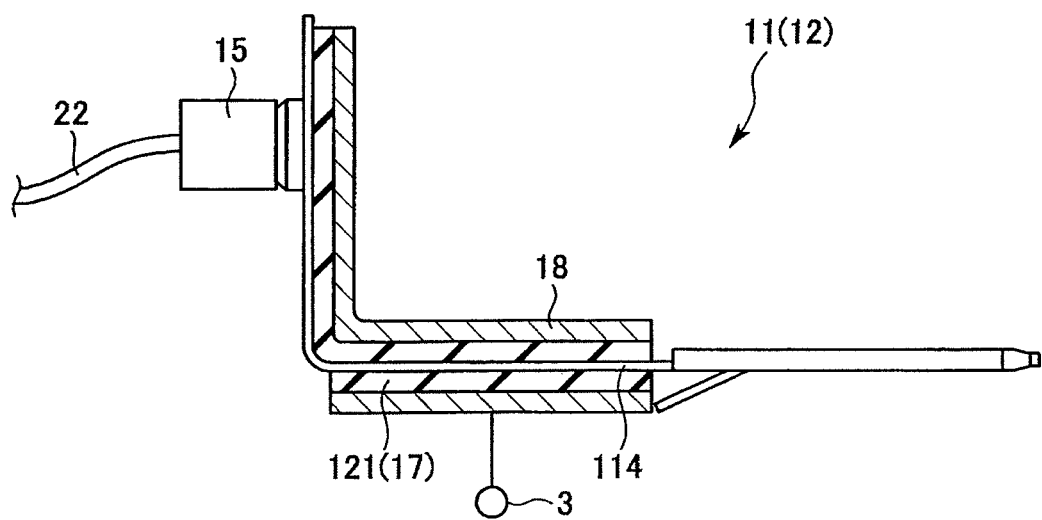
FIG. 12 is a diagram showing a power-supply terminal according to a fourth modification example of the exemplar embodiment.

More specifically, as shown in FIG. 12, each power-supply terminal 11 or 12 may be inserted into an insertion hole provided in a brush holder 121 made of insulation resin. Accordingly, each power-supply terminal 11 or 12 is fixed to the brush holder 121, and a part of the brush holder 121 functions as the insulation layer 17. Since the part of the brush holder 121 is used as the insulation layer 17, the number of components can be reduced as compared with the configuration in which the insulation layer 17 is provided additionally, and a manufacturing cost can be reduced. When a part of the brush holder 121 is used as the Insulation layer 17, the frame conductive layer 18 is, as shown in FIG. 12, formed on a side surface of the brush holder 121 opposite each power-supply terminal 11 or 12.

Figure 13:
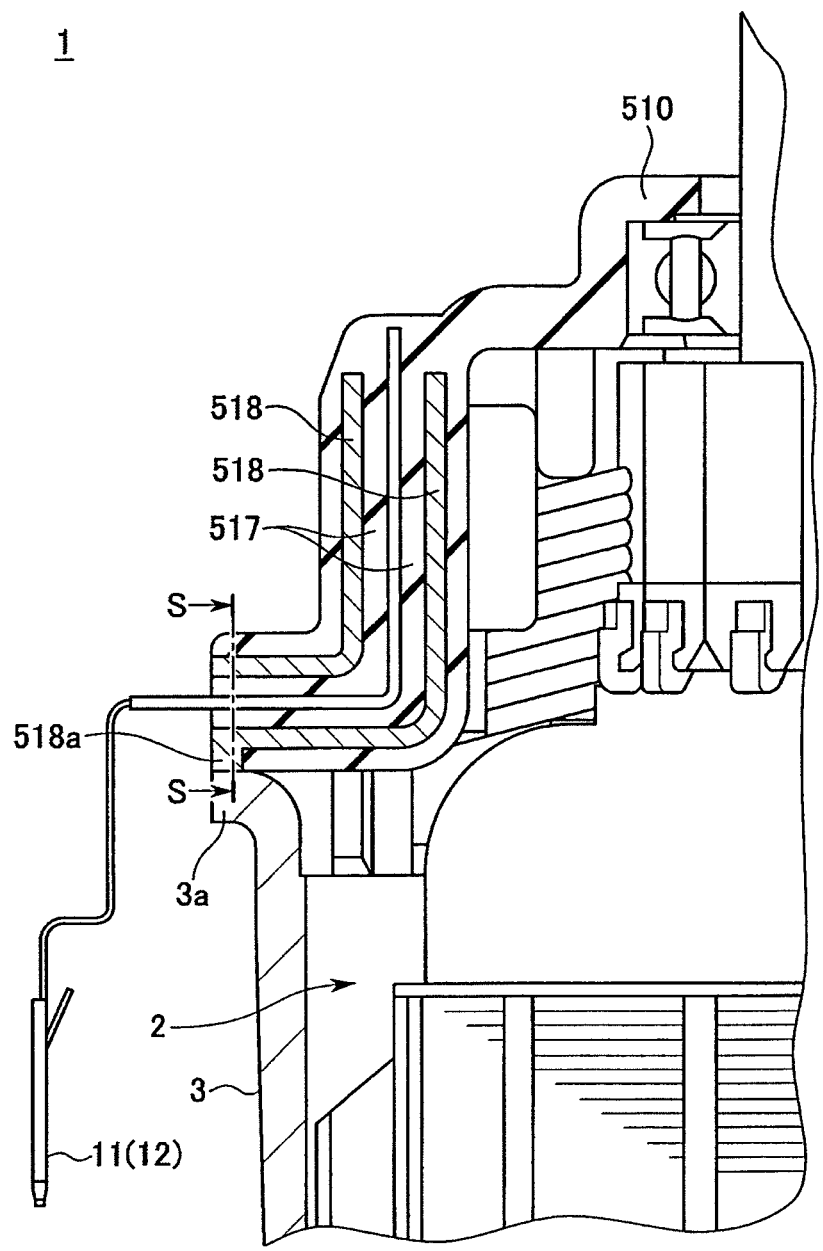
FIG. 13 is a sectional diagram showing an example configuration of the fourth modification example.
Figure 14A:
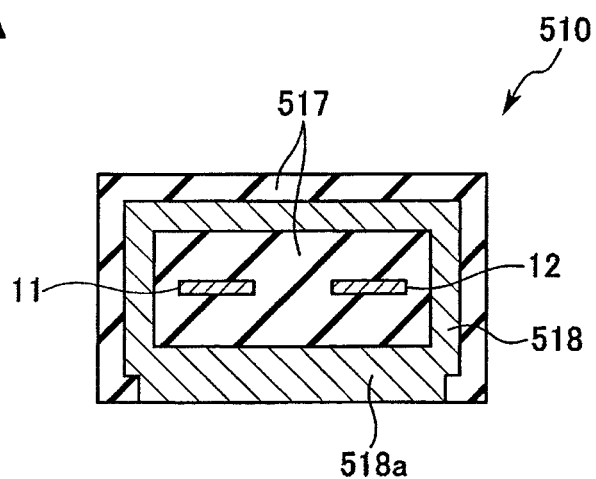
FIG. 14A is a sectional diagram taken along a line S-S of FIG. 13.

Another example of the configuration where a part of a brush holder is used as an insulation layer will be described. As shown in FIGS. 13 and 14A, a frame conductive layer 518 is embedded in a brush holder 510 made of resin. In this case, the brush holder 510, the frame conductive layer 158 and each power-supply terminal 11 or 12 are integrated. More specifically, the brush holder 510 is molded as following. A base material for the frame conductive layer 518 and the power-supply terminals 11 and 12 are put into a non-shown mold firstly. The base material for the frame conductive layer 518 is, for example, an approximately prismatic cylindrical metallic body. The power-supply terminals 11 and 12 are set inside the mold such that end portions of the power-supply terminals 11 and 12 are located in an inner space of the cylindrical metallic body that is the base material for the frame conductive layer 518. The end portions of the power-supply terminals 11 and 12 are opposite from ends of the power-supply terminals 11 and 12 connected to the power source. Next, insulation resin is poured into the mold, and consequently, the brush holder 510 in which the frame conductive layer 518 is embedded is obtained.

The end portions of the power-supply terminals 11 and 12 are embedded In the molded blush holder 510 in addition to the frame conductive layer 518. As shown in FIGS. 13 and 14A, the power-supply terminals 11 and 12 are located inside the frame conductive layer 518. Thus, each power-supply terminal 11 or 12 is integrated with the brush holder 510, and the end portion of each power-supply terminal 11 or 12 extends through the brush holder 510. A portion of the brush holder 510, which is located inside the frame conductive layer 518, is used as an insulation layer 517. In other words, a portion of the brush layer 510, which is located between the frame conductive layer 518 and each power-supply terminal 11 or 12, is used as the insulation layer 517. As shown in FIG. 14A, the frame conductive layer 518 includes a protrusion portion 518a protruding outward of the brush holder 510. The protrusion portion 518a extends such that an end of the protrusion portion 518a reaches an outer surface of the brush holder 510. As shown in FIG. 13, the protrusion portion 518a of the frame conductive layer 518 is in contact with the flange 3a of the motor yoke 3.

Figure 14B:
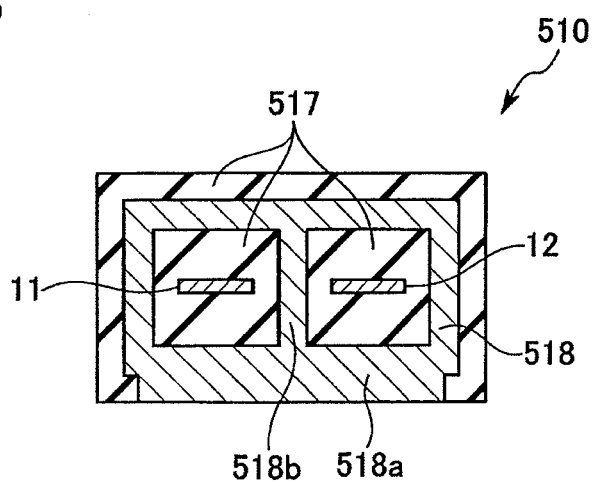
FIG. 14B is a sectional diagram showing another example of a structure of a brush holder corresponding to FIG. 14A.

Also in this case, the tubular capacitor 19 can be provided by combination of the insulation layer 517 and the frame conductive layer 518. A part of the brush holder 510 is used as the insulation layer 517, and the frame conductive layer 518 is embedded in the brush holder 510. Accordingly, the motor 1 including the tubular capacitor 19 can be made to be more compact, and the structure of the motor 1 can be simplified. The shape of the frame conductive layer 518 embedded in the brush holder 510 is not limited especially. For example, as shown in FIG. 14B, the frame conductive layer 518 has a partition portion 518b that partitions the inner space of the frame conductive layer 518 into two spaces. The partition portion 518b is located between the first power-supply terminal 11 and the second power-supply terminal 12. The first power-supply terminal 11 is located in one of the two spaces of the frame conductive layer 518, and the second power-supply terminal 12 is located in the other of the two spaces of the frame conductive layer 518.

In the above-described embodiment, the insulation layer 17 is formed on the predetermined region of each power-supply terminal 11 or 12 by insert molding, and the frame conductive layer 18 enclosing the insulation layer 17 is formed. On the other hand, a part of an existing component of the motor may be used as the frame conductive layer 18. In this case, the number of components of the motor 1 can be reduced as compared with a configuration in which the frame conductive layer 18 is provided additionally as in the above-described embodiment. As a result, a manufacturing cost of the motor can be reduced.

Figure 15:
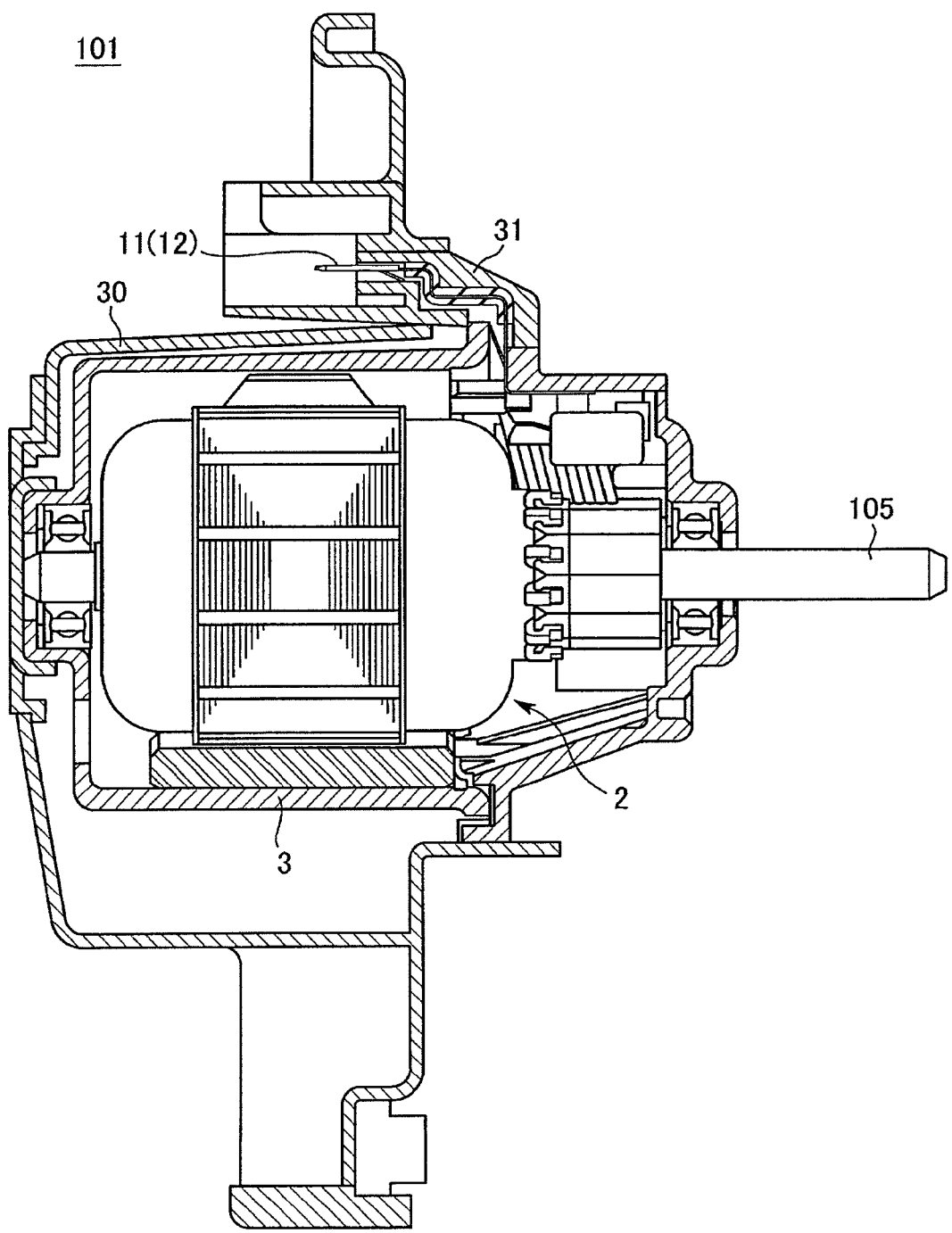
FIG. 15 is a diagram showing a motor according to a fifth modification example of the exemplar embodiment.
Figure 16:
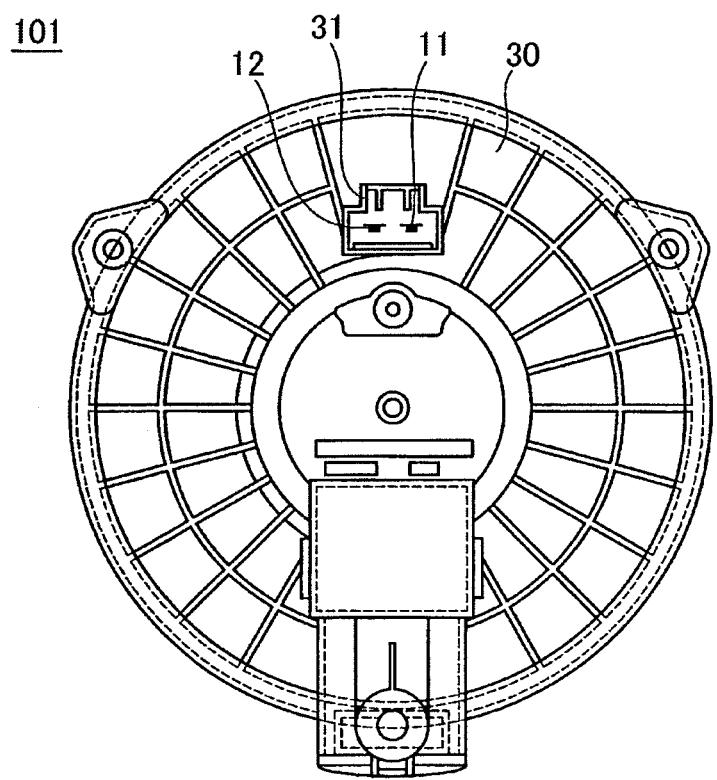
FIG. 16 is a front view showing the motor according the fifth modification example.

For example, a part of a motor holder 30 shown in FIG. 15 may be used as the frame conductive layer 18. The motor holder 30 made of metal is attached to the motor yoke 3 for keep an assembled position of a motor 101 shown in FIG. 15 and is fixed to a predetermine position. The motor holder 30 has a circular dish shape as shown in FIGS. 15 and 16. The motor holder 30 has a recess at its center portion, and the motor yoke 3 is fitted to the recess of the motor holder 30. Accordingly, the motor holder 30 is attached to the motor yoke 3. The motor holder 30 may be used as an example of a motor holding member attached to the accommodation body and fixed at a predetermine position to keep an attachment state of the motor.

As shown in FIGS. 15 and 16, a terminal insertion portion 31 is provided on a radially outer side of the center portion of the motor holder 30 and protrudes along an axial direction of a rotary shaft 105 of the motor 101. As shown in FIG. 15, the first power-supply terminal 11 and the second power-supply terminal 12 are inserted into the terminal insertion portion 31. When the first and second power-supply terminals 11 and 12 are inserted into the terminal insertion portion 31, the insulation layer 17 has been already formed on the predetermine region of each power-supply terminal 11 or 12.

The motor holder 30 including the terminal insertion portion 31 is made of metal and has electrical conductivity as a whole. When each power-supply terminal 11 or 12 on which the insulation layer 17 is formed is inserted into the terminal insertion portion 31, the frame conductive layer 18 enclosing the insulation layer 17 is provided to each power-supply terminal 11 or 12. As shown in FIG. 15, the motor holder 30 is in contact with the outer wall surface of the motor yoke 3. As a result, the insulation layer 17 and the frame conductive layer 18 provide the tubular capacitor 19.

Since a part of the motor holder 30 is used as the frame conductive layer 18, the number of components of the motor can be reduced as compared to the configuration in which the frame conductive layer 18 is provided additionally, and the manufacturing cost of the motor can be reduced.

Figure 17A:
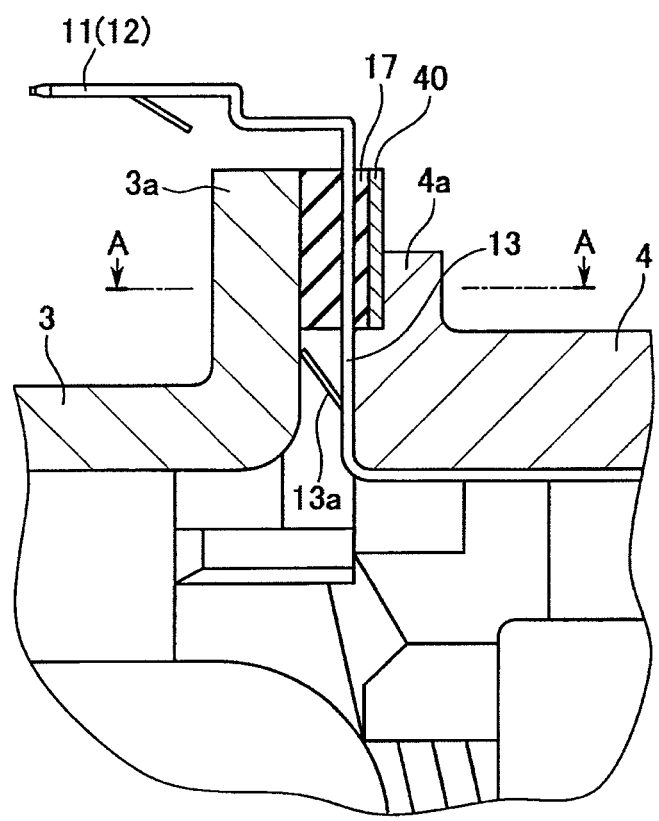
FIG. 17A is a sectional diagram showing a part of a motor around the power-supply terminal, according to a sixth modification example of the exemplar embodiment.
Figure 17B:
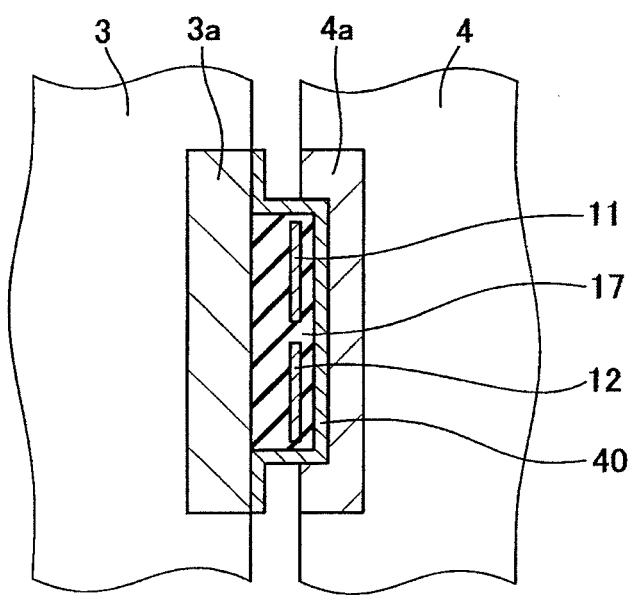
FIG. 17B is a sectional diagram taken along a line A-A of FIG. 17A.
Figure 18A:
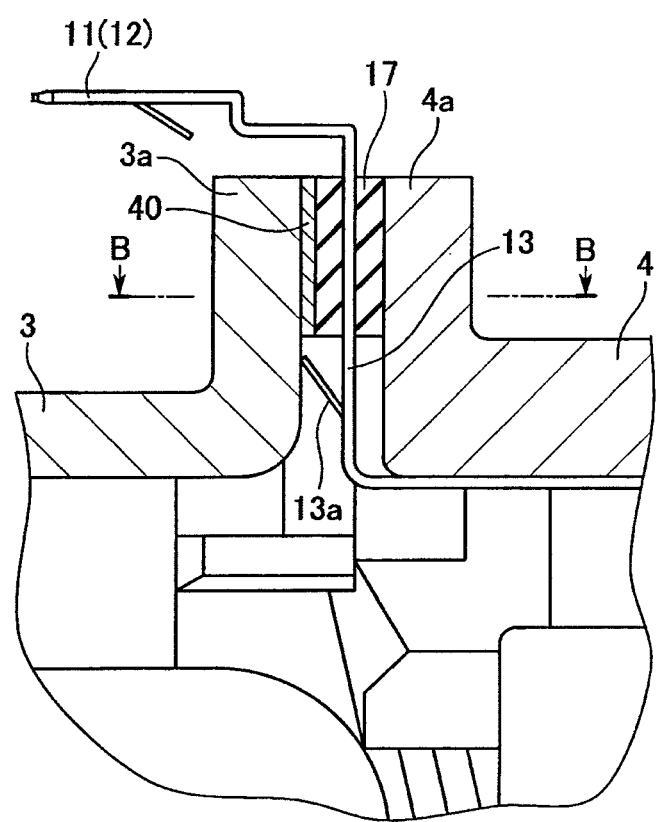
FIG. 18A is a sectional diagram showing a part of a motor around the power-supply terminal, according to a seventh modification example of the exemplar embodiment.
Figure 18B:
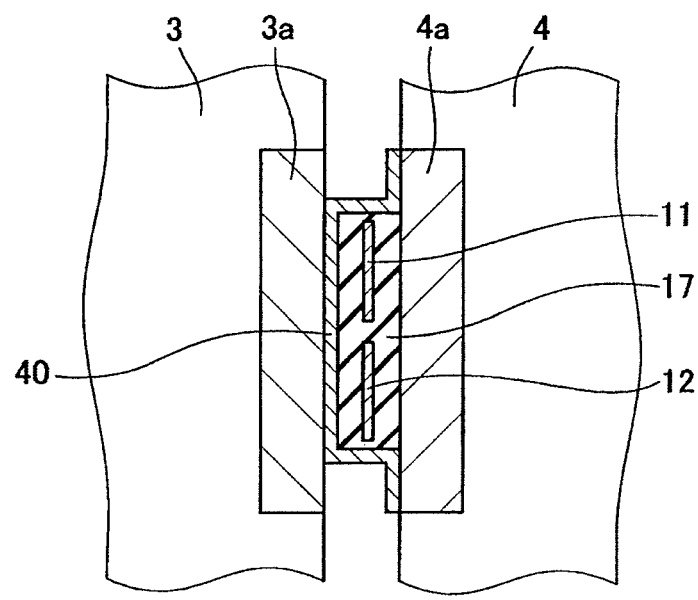
FIG. 18B is a sectional diagram taken along a line B-B of FIG. 18A.

Other exemplar cases in which a part of an existing component of the motor 1 is used as the frame conductive layer 18 will be described. For example, there are (i) a first case where a part of the motor yoke 3 is used as the frame conductive layer 18 as shown in FIGS. 17A and 17B, (ii) a second case where a part of the end plate 4 is used as the frame conductive layer 18 as shown in FIGS. 18A and 18B, and (iii) a third case where both a part of the motor yoke 3 and a part of the end plate 4 are used as the frame conductive layer 18 as shown in FIGS. 19A to 20B. The first to third cases will be described below.

A configuration of the motor 1 of the first case is much the same as the configuration described with reference to FIGS. 1 to 5. However, in the first case, as shown in FIG. 17A, the insulation layer 17 covers a part of the opposing portion 13 that is a portion of each power-supply terminal 11 or 12 interposed between the flange 4a of the end plate 4 and the flange 3a of the motor yoke 3. In the first case, the frame conductive layer 18 formed by metallic plating or pasting a metallic tape is not provided on the outer surface of the insulation layer 17. The first case is different from the above-described embodiment in these points.

As shown in FIGS. 17A and 17B, in the first case, a surface of the insulation layer 17 on one side in the axial direction of the rotary shaft 5 is in contact with an end surface of the flange 3a of the motor yoke 3. A surface of the insulation layer 17 on the other side in the axial direction is in contact with a metallic plate 40 supported by the flange 4a of the end plate 4. The metallic plate 40 has a predetermined width in the rotation direction of the rotary shaft 5. As shown in FIG. 17B, both end portions of the metallic plate 40 in the rotation direction are in contact with the flange 3a of the motor yoke 3. Thus, in the first case, the insulation layer 17 is enclosed by the flange 3a of the motor yoke 3 and the metallic plate 40.

Both the flange 3a of the motor yoke 3 and the metallic plate 40, which enclose the Insulation layer 17, are made of a conductive material. More specifically, both the flange 3a of the motor yoke 3 and the metallic plate 40 are made of a metallic material. The end plate 4 is made of a non-conductive material.

Accordingly, in the first case, the flange 3a of the motor yoke 3 and the metallic plate 40, which enclose the insulation layer 17, are used as the frame conductive layer 18. Hence, the flange 3a of the motor yoke 3, the metallic plate 40, the insulation layer 17 and each power-supply terminal 11 or 12 provide the tubular capacitor 19 shown in FIG. 5. Since a part of the motor yoke 3 that is an existing component of the motor 1 is used as a part of the frame conductive layer 18, increase in the number of components and change in size of the motor 1 can be limited.

Next, the second case where a part of the end plate 4 is used as the frame conductive layer 18 will be described. The second case is similar to the above-described first case in configuration. As shown in FIGS. 18A and 18B, the insulation layer 17 is formed on each power-supply terminal 11 or 12, and one end surface of the insulation layer 17 in the axial direction of the rotary shaft 5 is in contact with an end surface of the flange 4a of the end plate 4. The other end surface of the insulation layer 17 in the axial direction is in contact with a metallic plate 40 supported by the flange 3a of the motor yoke 3. The metallic plate 40 has a predetermined width in the rotation direction of the rotary shaft 5. Both end portions of the metallic plate 40 in rotation direction contacts the flange 4a of the end plate 4, as shown in FIG. 18B. Thus, the metallic plate 40 and the flange 4a of the end plate 4 enclose the insulation layer 17. In the second case, the end plate 4 is made of a conductive material. More specifically, the end plate 4 is made of a metallic material or a conductive resin material.

In the second case, the flange 4a of the end plate 4 and the metallic plate 40, which enclose the insulation layer 17, are used as the frame conductive layer 18. In the second case, the end plate 4 is in contact with the second power-supply terminal 12. As a result, the flange 4a of the end plate 4, the metallic plate 40 and the insulation layer 17 provide the tubular capacitor 19. Since a part of the end plate 4 that is an existing component of the motor 1 is used as a part of the frame conductive layer 18, increase in the number of components and change in size of the motor 1 can be limited.

Figure 19A:
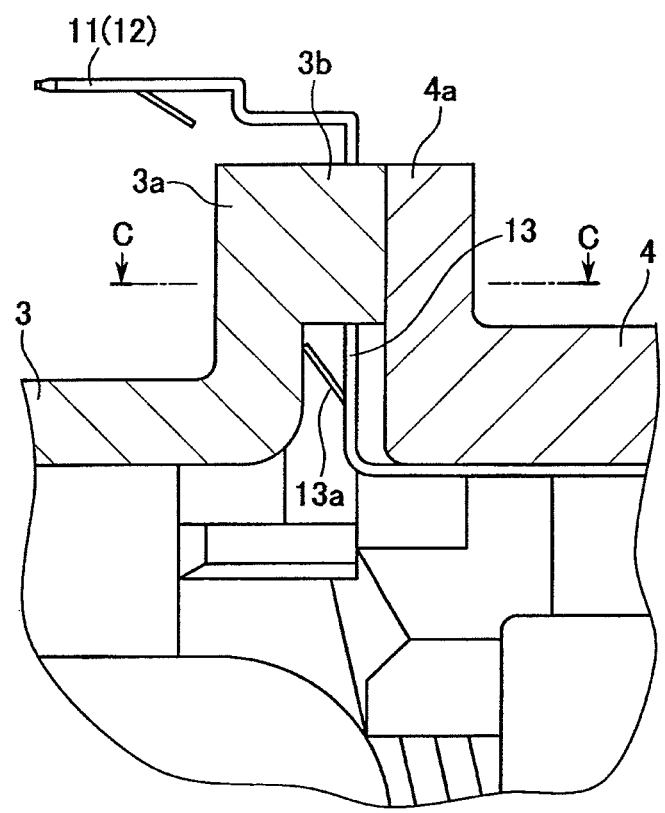
FIG. 19A is a sectional diagram showing a part of a motor around the power-supply terminal, according to an eighth modification example of the exemplar embodiment.
Figure 19B:
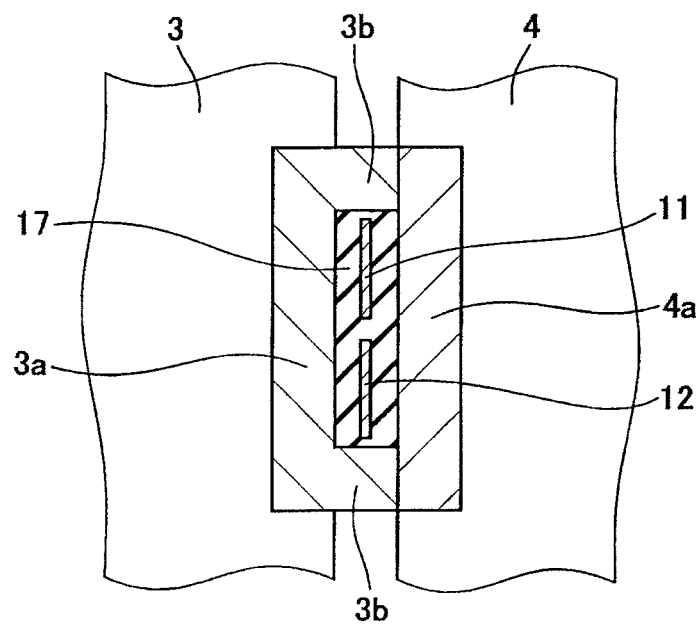
FIG. 19B is a sectional diagram taken along a line C-C of FIG. 19A.
Figure 20A:
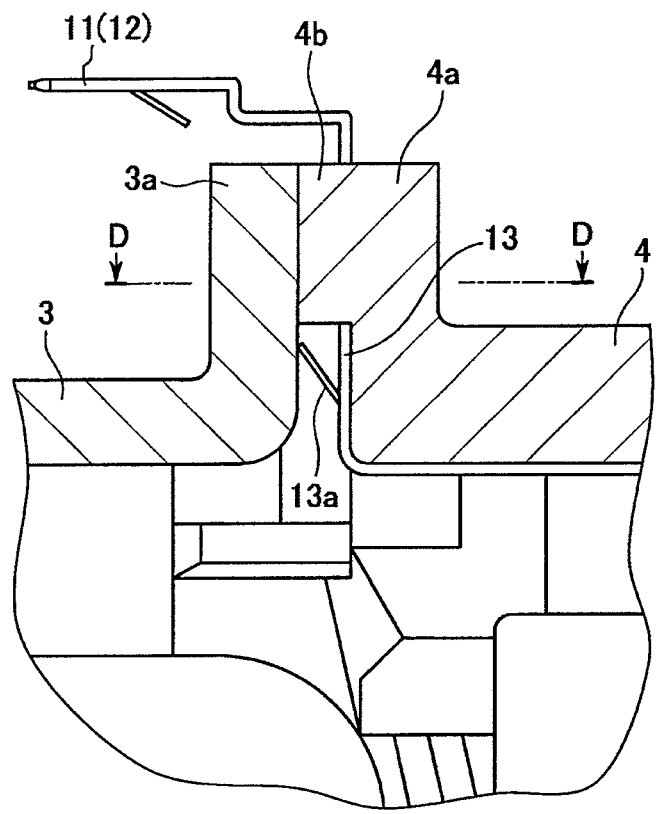
FIG. 20A is a sectional diagram showing a part of a motor around the power-supply terminal, according to a ninth modification example of the exemplar embodiment.
Figure 20B:
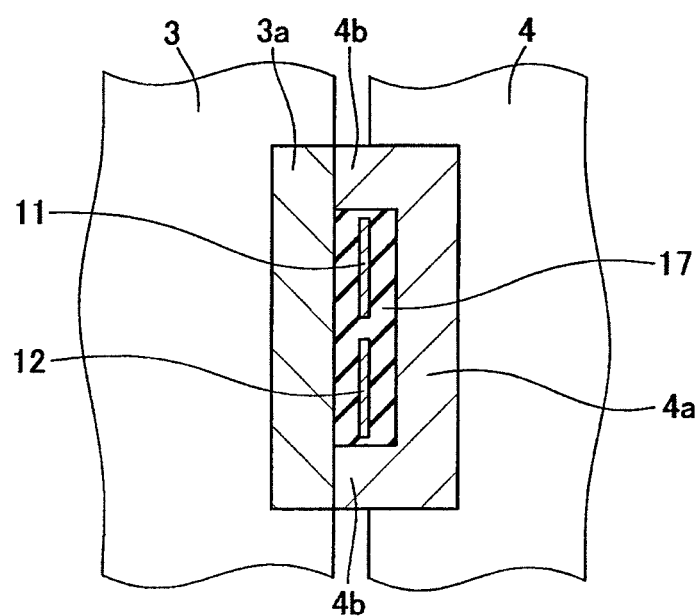
FIG. 20B is a sectional diagram taken along a line D-D of FIG. 20A.

Next, the third case where both a part of the motor yoke 3 and a part of the end plate 4 are used as the frame conductive layer 18 will be described. In the third case, the configuration of the above-described first case and the configuration of the above-described second case are combined. As shown in FIGS. 19B and 20B, the insulation layer 17 is formed on each power-supply terminal 11 or 12, and one end surface of the insulation layer 17 in the axial direction of the rotary shaft 5 is in contact with the flange 3a of the motor yoke 3. The other end surface of the insulation layer 17 in the axial direction is in contact with the flange 4a of the end plate 4. As shown in FIG. 19A, the flange 3a of the motor yoke 3 includes a protrusion portion 3b that protrudes to the flange 4a of the end plate 4 and contacts the flange 4a of the end plate 4. Alternatively, as shown in FIG. 20A, the flange 4a of the end plate 4 may include a protrusion portion 4b that protrudes to the flange 3a of the motor yoke 3 and contacts the flange 3a of the motor yoke 3.

In the third case, as shown in FIGS. 19B and 20B, the flanges 3a and 4a of the motor yoke 3 and the end plate 4, and the above-described protrusion portion 3b or 4b enclose the insulation layer 17. The flange 3a of the motor yoke 3, the flange 4a of the end plate 4 and the protrusion portion 3b or 4b are made of a conductive material, more specifically, made of a metallic material. Hence, in the third case, the flange 3a of the motor yoke 3, the flange 4a of the end plate 4 and the protrusion portion 3b or 4b provide the frame conductive layer 18. In the third case, the second power-supply terminal 12 is connected to the negative electrode of the power source, and thus, the outer wall surface of the motor yoke 3 is grounded through the second power-supply terminal 12, similar to the above-described embodiment. Since the flange 4a of the end plate 4 contacts the flange 3a of the motor yoke 3 via the protrusion portion 3b or 4b, the flange 4a of the end plate 4 is also grounded. As a result, the flange 4a of the end plate 4, the flange 3a of the motor yoke 3 and the insulation layer 17 provide the tubular capacitor 19. Thus, in the third case, the flanges 3a and 4a of the motor yoke 3 and the end plate 4, which are existing components of the motor 1, are used as the frame conductive layer 18. Therefore, increase in the number of components of the motor 1 and change in size of the motor 1 can be limited more effectively.

Figure 21:
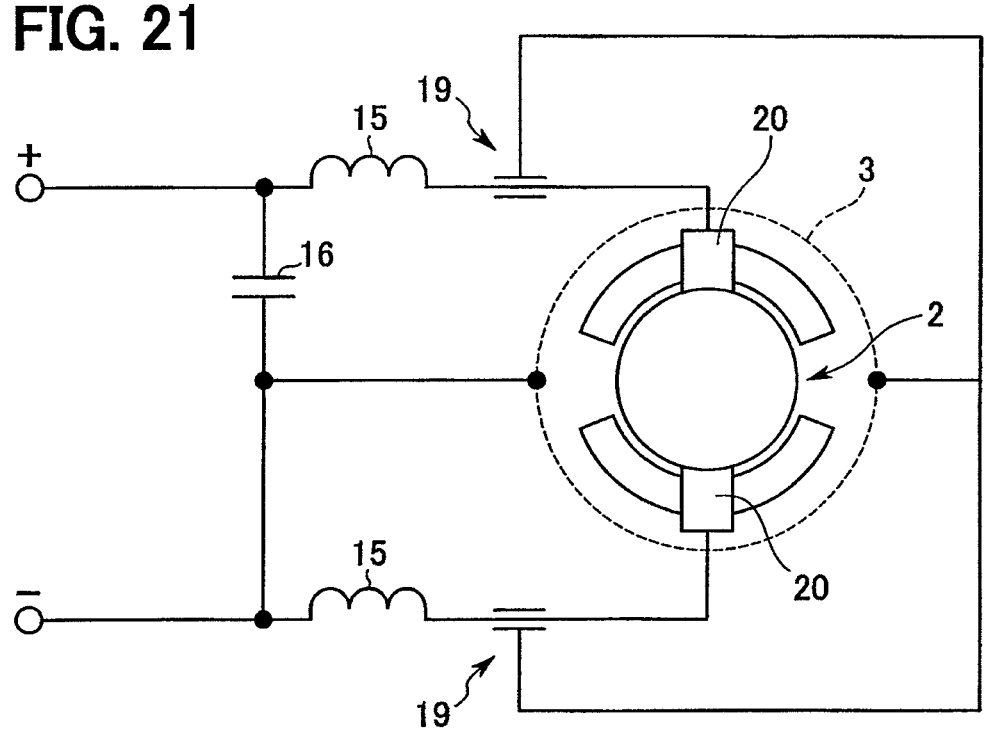
FIG. 21 is a diagram showing a first modified example of the electric circuit, according to a tenth modification example of the exemplar embodiment.
Figure 22:
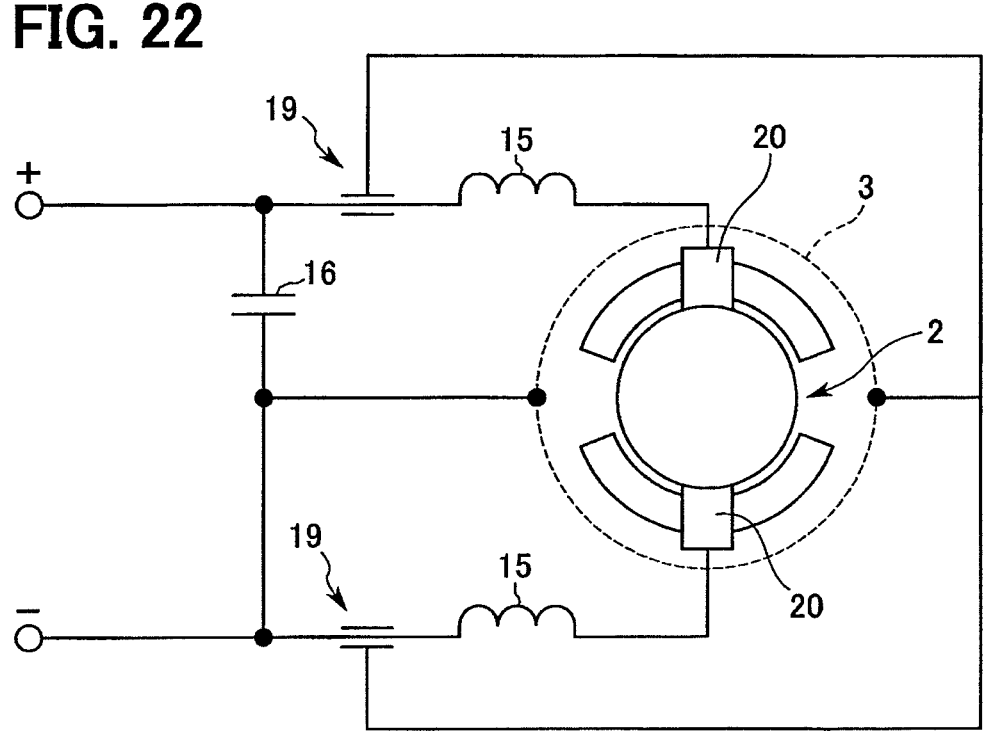
FIG. 22 is a diagram showing a second modified example of the electric circuit, according to the tenth modification example.

In the above-described embodiment, the tubular capacitor 19 provided by forming the insulation layer 17 and the frame conductive layer 18 on each power-supply terminal 11 or 12 is located between the choke coil 15 and the power source as shown in FIG. 5. The location of the tubular capacitor 19 is not limited, and the tubular capacitor 19 may be located between the choke coil 15 and the brush 20 as shown in FIG. 21. In the above-described embodiment, a terminal of the capacitor 16 is connected to the line between each power-supply terminal 11 or 12 and the brush 20, and the connection position of the capacitor 16 in the line is located between the choke coil 15 and the tubular capacitor 19. However, the connection position of the capacitor 16 to the line is not limited to the above. As shown in FIG. 22, the connection position of the capacitor 16 may be located between the power source and the tubular capacitor 19, and the choke coil 15 may be located between the tubular capacitor 19 and the brush 20.

Figure 23:
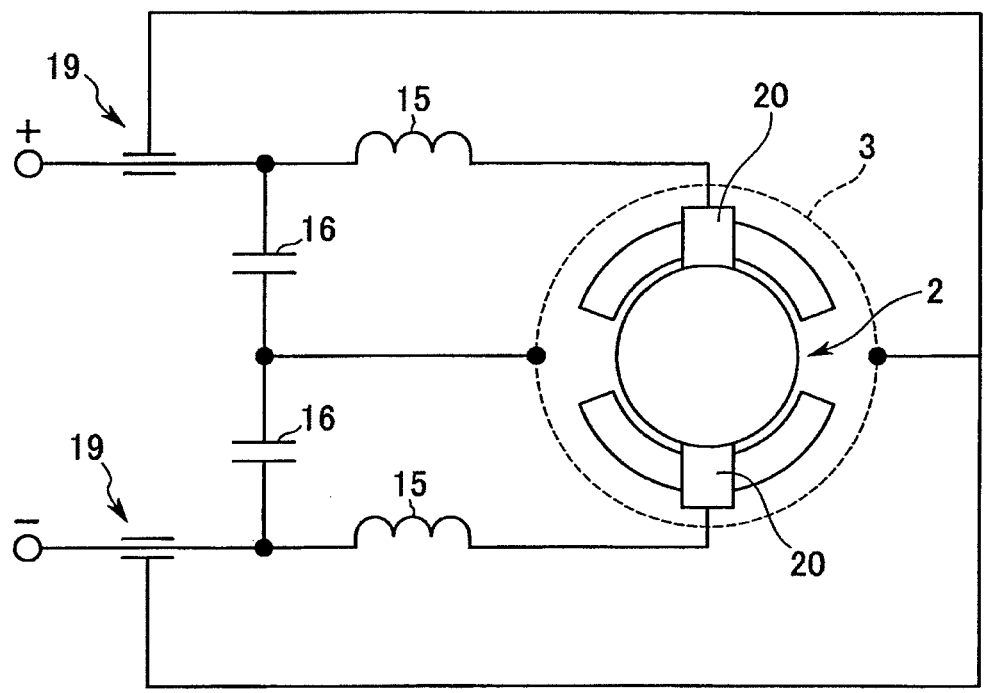
FIG. 23 is a diagram showing a third modified example of the electric circuit, according to the tenth modification example.

In the above-describe embodiment, as shown in FIG. 5, the number of capacitors 16 is one. However, the number of capacitors can be set without limitation. For example, as shown in FIG. 23, two capacitors 16 may be provided.

In the above-described embodiment, the frame conductive layer 18 provided to each power-supply terminal 11 or 12 is connected to the outer wall surface of the motor yoke 3. When the motor holder 30 is made of metal, the frame conductive layer 18 can be electrically connected to the motor yoke 3 via the motor holder 30. However, the motor holder 30 may be made of resin, and the frame conductive layer 18 may be electrically connected directly to the motor yoke 3.

In the above-described embodiment, both the insulation layer 17 and the frame conductive layer 18, which are provided to each power-supply terminal 11 or 12, have single layer structures. However, the layer structures of the insulation layer and the frame conductive layer are not limited to the single layer structure. For example, the insulation layer and the frame conductive layer may have a laminated structure as shown in FIG. 24.

Figure 24A:
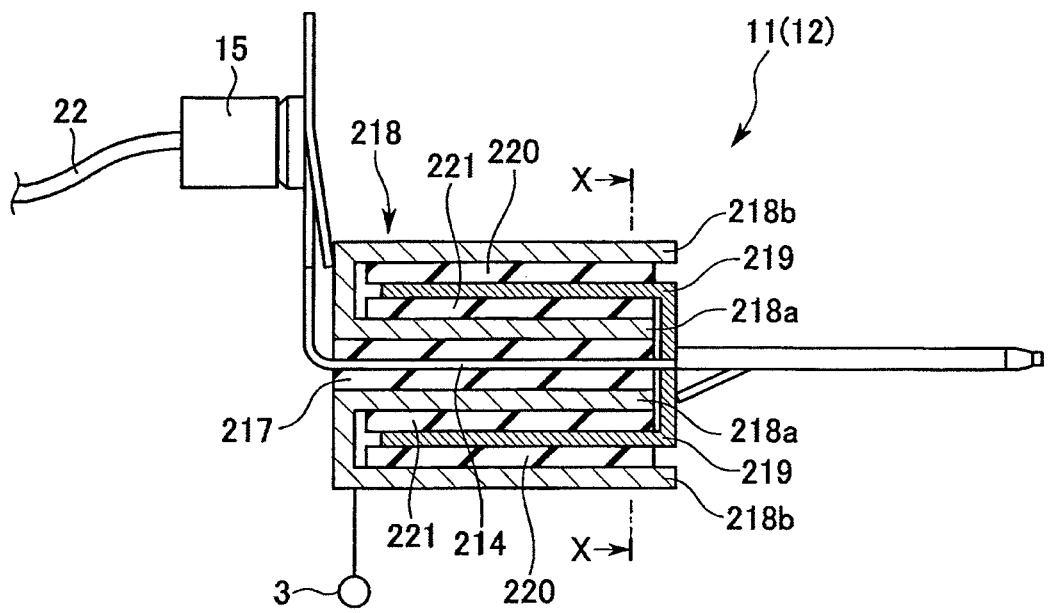
FIG. 24A is a sectional diagram showing a power-supply terminal according to an eleventh modification example of the exemplar embodiment.

In FIG. 24, each power-supply terminal 11 or 12 includes a terminal body 214, and a terminal enclosing portion 219. The terminal body 214 connects the both end portions of each power-supply terminal 11 or 12. As described above, one end portion of each power-supply terminal 11 or 12 is connected to the power source, and the other end portion of each power-supply terminal 11 or 12 is connected to the pigtail wire 22. The terminal body 214 corresponds to the extending portion 114 shown in FIG. 10. The terminal enclosing portion 219 has an approximately prismatic cylindrical shape and encloses the terminal body 214. As shown in FIG. 24A, the terminal enclosing portion 219 has a closed end on one end side of the terminal enclosing portion 219. The terminal body 214 extends through the closed end of the terminal enclosing portion 219 and is connected to the terminal closed end. Both the terminal body 214 and the terminal enclosing portion 219 have electric conductivity.

Figure 24B:
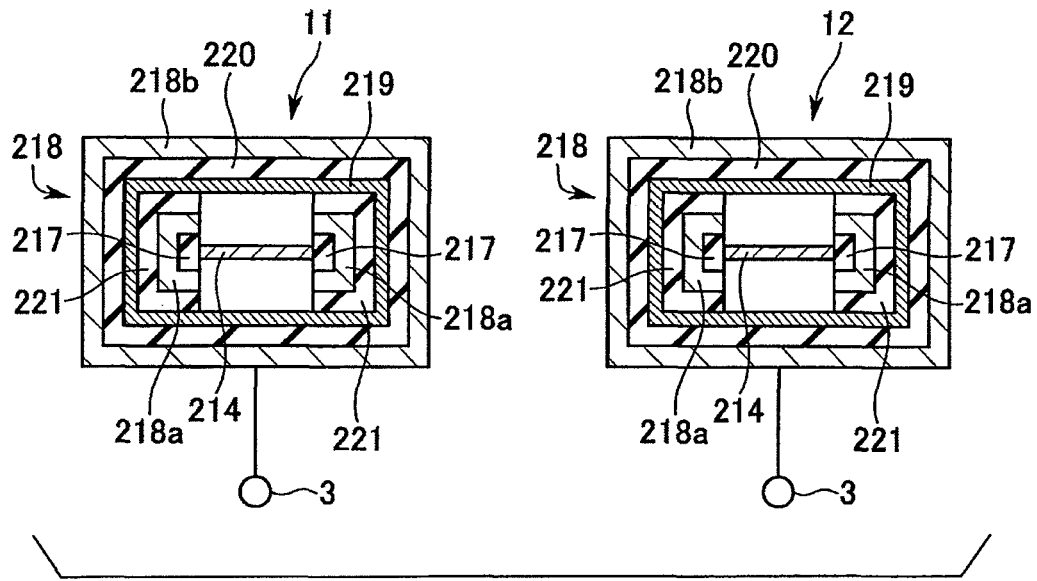
FIG. 24B is a sectional diagram taken along a line X-X of FIG. 24A.

As shown in FIG. 24B, outer peripheral surfaces of the terminal body 214 on both sides in the rotation direction of the rotary shaft 5 are in contact with a first insulation layer 217 in the connected state where each power-supply terminal 11 or 12 is connected to the power source. An outer peripheral surface of the terminal enclosing portion 219 is in contact with a second insulation layer 220 different from the above-described first insulation layer 217 in the connected state. Thus, in FIGS. 24A and 24B, the two insulation layers 217 and 220 different from each other are provided to each power-supply terminal 11 or 12. As shown in FIGS. 24A and 24B, an inner peripheral surface of the terminal enclosing portion 219 is in contact with a third insulation layer 221 in the connected state. The terminal body 214 may be used as an example of a power-supply member body connecting both end portions of each power-supply member contacting the first A frame conductive layer 218 includes a hollow portion and an inner portion housed inside the hollow portion. As shown in FIGS. 24A and 24B, more specifically, the inner portion of the frame conductive layer 218 is a first frame conductive layer 218a that is in contact with the first Insulation layer 217 opposite the terminal body 214 in the connected state. As shown in FIG. 24B, the first frame conductive layer 218a is interposed between the first insulation layer 217 and the third insulation layer 221.

The hollow portion of the frame conductive layer 218 is a second frame conductive layer 218b that is in contact with the second insulation layer 220 opposite the terminal enclosing portion 219 in the connected state. The second frame conductive layer 218b is connected to the motor yoke 3 in the connected state for grounding. The hollow portion that is the second frame conductive layer 218b is connected to the inner portion that is the first frame conductive layer 218a. Thus, when the second frame conductive layer 218b is grounded, the first frame conductive layer 218a is also grounded. Accordingly, the above-described terminal body 214, the first insulation layer 217, the first frame conductive layer 218a, the terminal enclosing portion 219, the second insulation layer 220 and the second frame conductive layer 218b provide the tubular capacitor 19.

Figure 25:
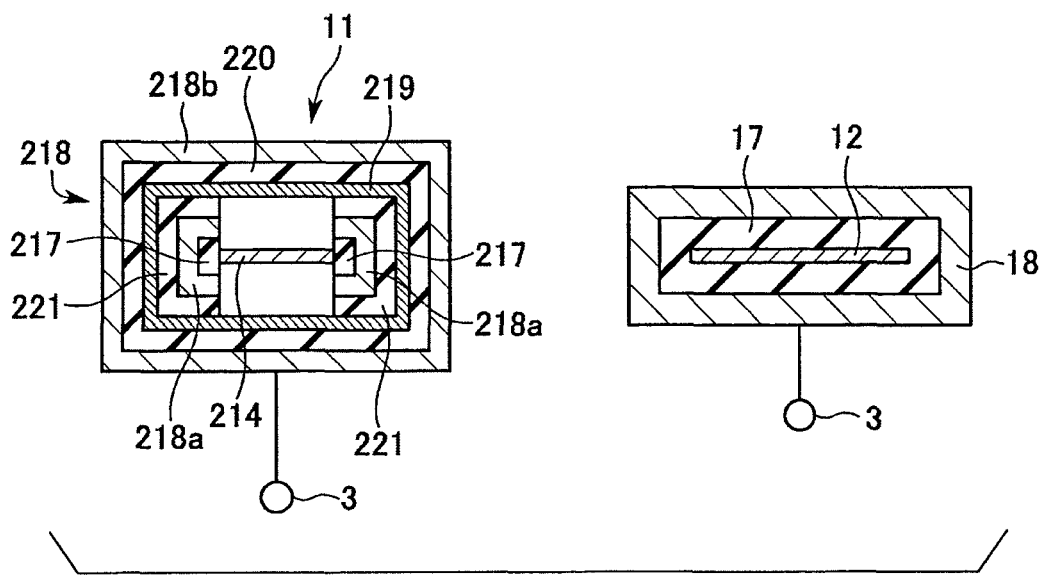
FIG. 25 is a sectional diagram showing another example of the power-supply terminals according to the eleventh modification example.

Accordingly, in the configuration shown in FIG. 24, multiple numbers of the insulation layers and multiple numbers of the frame conductive layers are provided so as to form a laminated structure. When the numbers of the insulation layers and the frame conductive layers are multiple, the electrostatic capacitance of the tubular capacitor 19 can be increased as compared with a case where the numbers of the insulation layers and the frame conductive layers are one. Therefore, the configuration shown in FIG. 24 is capable of limiting noise propagation within a wider frequency range. In the configuration shown in FIG. 24, multiple insulation layers and multiple frame conductive layers are provided to both the first power-supply terminal 11 and the second power-supply terminal 12. However, as shown in FIG. 25, multiple insulation layers and multiple frame conductive layers may be provided to one of the power-supply terminals 11 or 12, and a single insulation layer and a single frame conductive layer may be provided to the other of the power-supply terminals 11 or 12. For example, in FIG. 25, multiple insulation layers and multiple frame conductive layers is provided to the first power-supply terminal 11, and a single insulation layer and a single frame conductive layer is provided to the second power-supply terminal 12.

In the above-described embodiment, the power-supply terminal having a flat-plate-like shape is used for explanation as an example of the power-supply member. However, the shape of the power-supply terminal is not limited to the flat-plate-like shape. The shape of the power-supply terminal may have a pin-like shape having a circular shape in cross-section. The power-supply member may include other components in addition to the power-supply terminal. Examples of the other components of the power-supply member will be described with reference to FIGS. 26A to 27B.

Figure 26A:
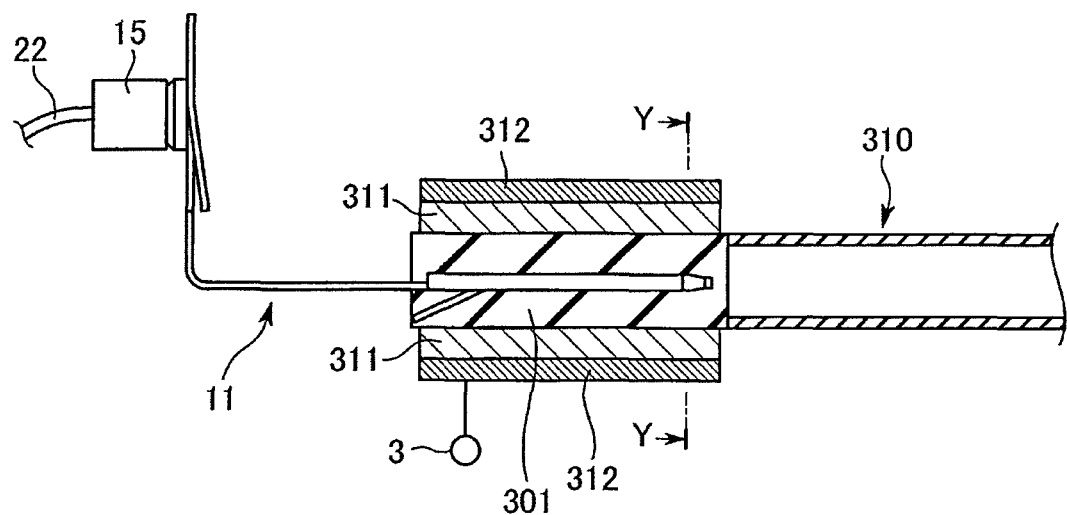
FIG. 26A is a schematic sectional diagram showing a power-supply terminal according to a twelfth modification example of the exemplar embodiment.
Figure 26B:
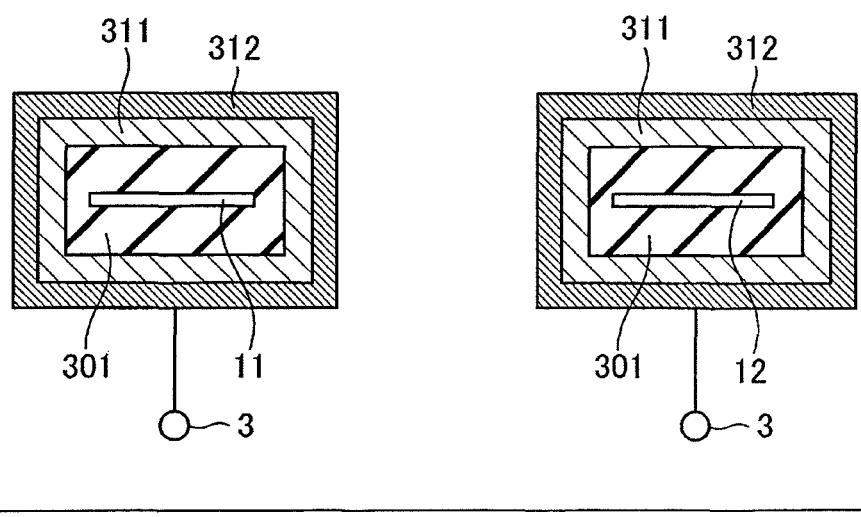
FIG. 26B is a sectional diagram taken along a line Y-Y of FIG. 26A.

The power-supply member according to FIGS. 26A and 26B includes a first connector body 301 and a second connector body 302 to which the first power-supply terminal 11 and the second power-supply terminal 12 are inserted and connected, respectively. More specifically, the first connector body 301 inserted into the first power-supply terminal 11 is used as a part of the first power-supply member, and the second connector body 302 inserted into the second power-supply terminal 12 is used as a part of the second power-supply member. The first connector body 301 and the second connector body 302 have similar structures, and thus only the structure of the first connector body 301 will be described for example.

The first connector body 301 has electric conductivity and has an approximately rectangular parallelepiped shape. The first connector body 301 is attached to an end portion of a harness 310 that is a bundled wire connected to the power source. The first connector body 301 connects the harness 310 and the first power-supply terminal 11. The first connector body 301 has an insertion hole at a center part of the first connector body 301, and the power-supply terminal is inserted into the insertion hole of the first connector body 301. When the first power-supply terminal 11 is inserted into the insertion hole of the first connector body 301, the first power-supply terminal 11 is electrically connected to the positive electrode of the power source.

When the first power-supply terminal 11 is inserted into the above-described insertion hole and connected to the first connector body 301, an inner peripheral surface of the first connector body 301 that defines the insertion hole is in contact with the first power-supply terminal 11 as shown in FIGS. 26A and 26B. An outer peripheral surface of the first connector body 301 is in contact with an Insulation layer 311, and the insulation layer 311 is in contact with a frame conductive layer 312 opposite the first connector body 301. The frame conductive layer 312 is connected to the outer wall surface of the motor yoke 3.

In this case shown in FIGS. 26A and 26B, the insulation layer 311 and the frame conductive layer 312, which are provided on an outer side of each first and second connector body 301 or 302, provide the tubular capacitor 19. Since the tubular capacitor 19 is provided around the connector bodies 301 and 302, the configuration for providing the tubular capacitor 19 can be made to be more compact and simple.

Figure 27A:
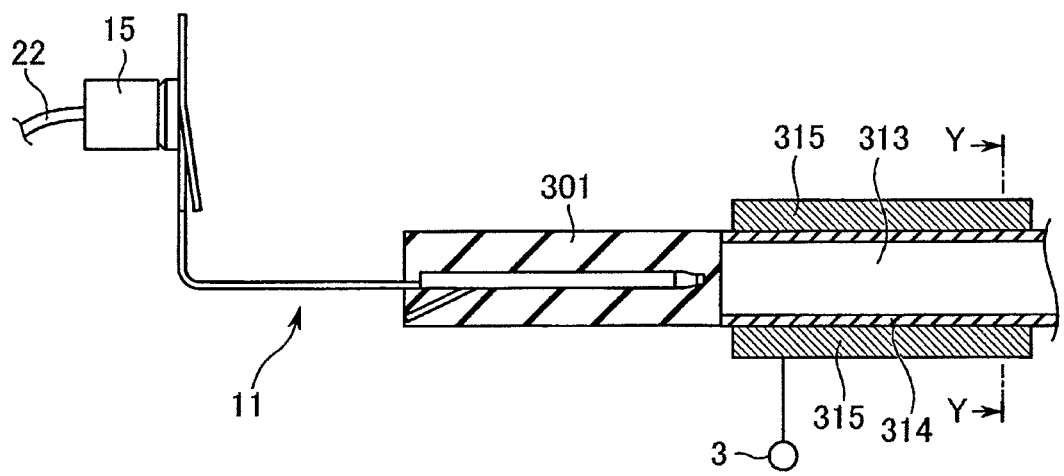
FIG. 27A is a schematic sectional diagram showing a power-supply terminal according to a thirteenth modification example of the exemplar embodiment.
Figure 27B:
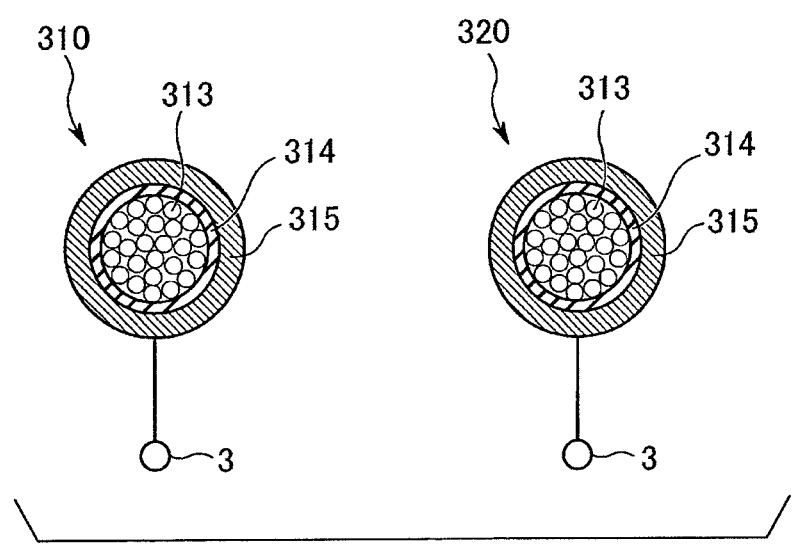
FIG. 27B is a sectional diagram taken along a line Y-Y of FIG. 27A.

The power-supply terminal according to FIGS. 27A and 27B includes the above-described harness, more specifically, the bundled wires 313 in the harnesses 310 and 320. The bundled wire 313 in the first harness 310 connected to the first power-supply terminal 11 via the first connector body 301 is used as a part of the first power-supply member. The bundled wire 313 in the second harness 320 connected to the second power-supply terminal 13 via the second connector body 302 is used as a part of the first power-supply member.

Each harness 310 or 320 includes the bundled wires 313 made of metal, and a cover member 314 that covers the bundled wires 313. The cover member 314 is made of an insulation material and is in contact with an outer peripheral surface of the bundled wires 313. In this case shown in FIGS. 27A and 27B, the cover member 314 functions as the insulation layer. The frame conductive layer 315 is formed on an outer peripheral surface of the cover member 314, in other words, the frame conductive layer 315 is formed on the cover member 314 opposite the bundled wires 313. The frame conductive layer 315 is connected to a position of the motor 1 which is connected to ground. For example, the frame conductive layer 315 is connected to the outer wall of the motor yoke 3.

Accordingly, in FIGS. 27A and 27B, the cover member 314 of each harness 310 or 320 and the frame conductive layer 315 provide the tubular capacitor 19. By providing the tubular capacitor 19 around each harness 310 or 320, the configuration for providing the tubular capacitor 19 can be made to be more compact and simple. Additionally, the cover member 314 of each harness 310 or 320 can be utilized as the insulation layer. Therefore, the tubular capacitor 19 can be provided by using existing components of the motor 1, and the tubular capacitor 19 can be made easily.

In the above-described embodiment, the insulation layer, the frame conductive layer and the power-supply member are integrally formed. However, a component including the insulation layer and the frame conductive layer may be provided separately from the power-supply member. In this case, the component including the insulation layer and the frame conductive layer may be attached to the power-supply member after the power-supply member is fitted to the motor. An example of this configuration will be described referring to FIG. 28.

Figure 28:
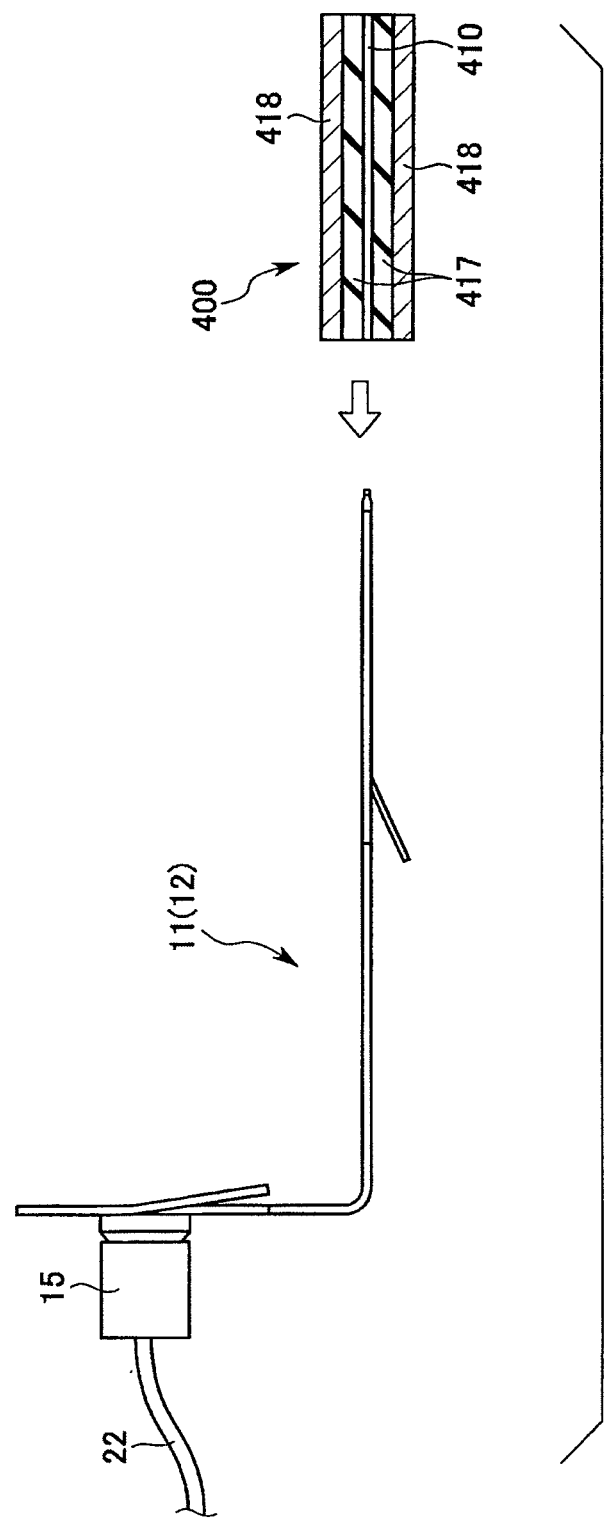
FIG. 28 is a diagram showing a power-supply terminal according to a fourteenth modification example of the exemplar embodiment.

In a configuration shown in FIG. 28, a laminated body 400 is provided separately from the power-supply terminals 11 and 12 that are examples of the power-supply member. The laminated body 400 includes an insertion hole 410 into which each power-supply terminal 11 or 12 is inserted, an insulation layer 417 enclosing the insertion hole 410, and a frame conductive layer 418 enclosing the insulation layer 417 on an outer side of the insulation layer 417. Each power-supply terminal 11 or 12 is inserted into the insertion hole 410, and the laminated body 400 is accordingly attached to each power-supply terminal 11 or 12. The laminated body 400 is detachable from each power-supply terminal 11 or 12. When the laminated body 400 is attached to each power-supply terminal 11 or 12, the insulation layer 417 and the frame conductive layer 418 are provided to each power-supply terminal 11 or 12. Since the laminated body 410 is used in the configuration shown in FIG. 28, the Insulation layer 417 and the frame conductive layer 418 can be provided to each power-supply terminal 11 or 12 after the power-supply terminals 11 and 12 are attached to a rotor (armature 2). Therefore, by using the laminated body 400, the configuration of the present disclosure, i.e. the configuration capable of reducing high-frequency noise effectively can be applied to, for example, a general motor that does not have the insulation layer or the frame conductive layer.

In the above-described embodiment, the positions of the insulation layer and the frame conductive layer are fixed. In other words, a member constituting the insulation layer and a member constituting the frame conductive layer are located statically. Alternatively, one of the insulation layer or the frame conductive layer may be movable relative to the other of the insulation layer or the frame conductive layer. An example of this configuration will be described referring to FIGS. 29A and 29B.

Figure 29A:
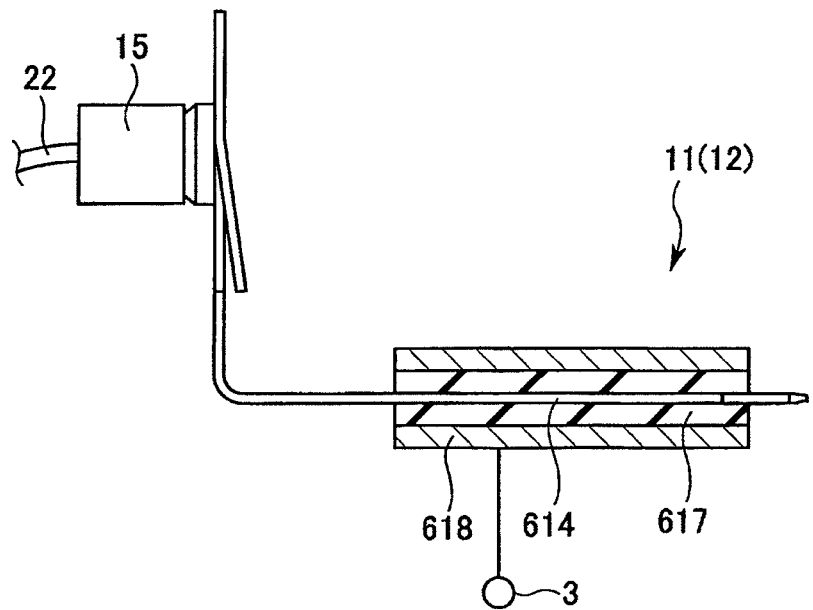
FIG. 29A is a diagram showing a power-supply terminal in which a frame conductive layer is movable relative to an insulation layer, according to a fifteenth modification example of the exemplar embodiment.
Figure 29B:
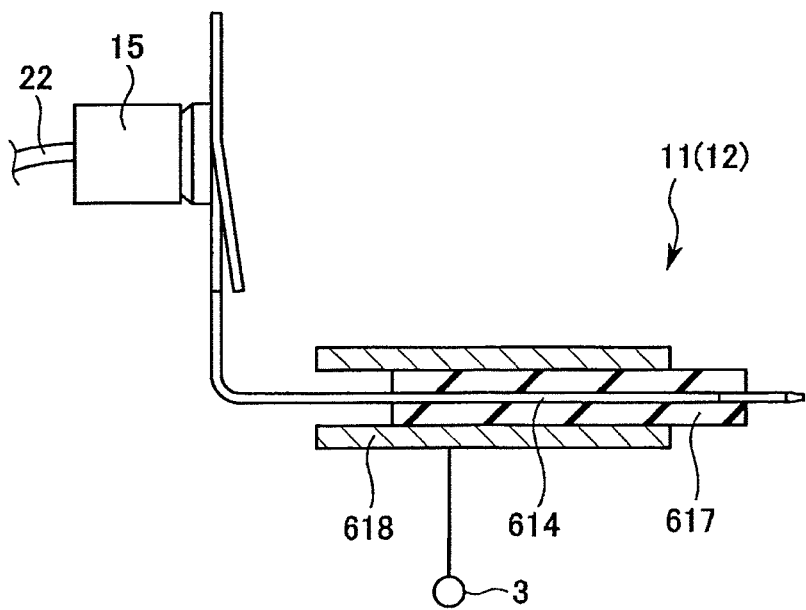
FIG. 29B is a diagram showing the power-supply terminal in which the frame conductive layer is moved relative to the insulation layer, according to the fifteenth modification example.

In the configuration shown in FIGS. 29A and 29B, an insulation layer 617 and a frame conductive layer 618 are in contact with each other, and the frame conductive layer 618 is movable relative to the insulation layer 617 along a surface of the insulation layer 617 contact with the frame conductive layer 618. More specifically, the insulation layer 617 is a resin molded product enclosing a terminal body 614 of each power-supply terminals 11 or 12, and a frame conductive layer 618 is a metallic film covering the resin molded product and is slidable along an outer surface of the resin molded product that is the insulation layer 617.

When the frame conductive layer 618 slides on the insulation layer 617, the position of the frame conductive layer 618 is moved relative to the insulation layer 617. The frame conductive layer 618 is movable between a position where only the insulation layer 617 exists between the frame conductive layer 618 and the terminal body 614 as shown in FIG. 29A and a position where the insulation layer 617 and an air space exist between the frame conductive layer 618 and the terminal body 614 as shown in FIG. 29B. In the configuration shown in FIGS. 29A and 29B, existence or non-existence of the air space or a size of the air space between the frame conductive layer 618 and the terminal body 614 can be adjusted by moving the frame conductive layer 618 relative to the insulation layer 617. Accordingly, the electrostatic capacitance of the tubular capacitor 19 provided by the insulation layer 617 and the frame conductive layer 618 can be adjusted. Since the electrostatic capacitance of the tubular capacitor 19 is adjustable, a noise frequency range within which noise is reduced by the tubular capacitor 19 can be shifted easily. The frame conductive layer 618 slides on the insulation layer 617 in the configuration shown in FIGS. 29A and 29B as described above. Alternatively, the insulation layer 617 may slide along the frame conductive layer 618.

In the above-described embodiment, the insulation layer has a uniform structure, and a relative permittivity of the insulation layer is even in an entire region of the insulation layer. However, the structure of the insulation layer is not limited to this. The insulation layer may include multiple regions which are different from each other in relative permittivity. An example of this configuration will be described referring to FIG. 30.

Figure 30:
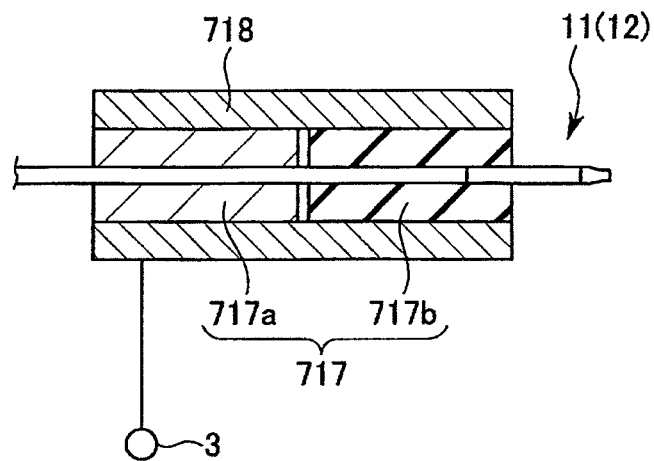
FIG. 30 is a diagram showing an example of a power-supply terminal according to a sixteenth modification example of the exemplar embodiment.

In the configuration of FIG. 30, an insulation layer 717 includes multiple regions which are different from each other in relative permittivity. For example, the insulation layer 717 consists of two regions 717a and 717b in FIG. 30. The relative permittivities of the two regions 717a and 717b are different from each other. On the other hand, thicknesses of the two regions 717a and 717b are approximately the same. Thus, a layer thickness of the insulation layer 717 is uniform as a whole. The regions 717a and 717b are arranged in parallel, in other words, arranged adjacent to each other along the frame conductive layer 718 between a frame conductive layer 718 and each power-supply terminal 11 or 12.

As described above, in the configuration shown in FIG. 30, the insulation layer 717 includes the multiple regions 717a and 717b different from each other in relative permittivity. Thus, the electrostatic capacitance of the tubular capacitor 19 provided by the insulation layer 717 and the frame conductive layer 718 depends on the relative permittivity of each region 717a or 717b. Since the electrostatic capacitance of the tubular capacitor 19 can be adjusted by adjusting the relative permittivity of each region 717a or 717b of the insulation layer 717, the frequency band within which noise is reduced by the tubular capacitor 19 can be shifted easily.

Figure 31:
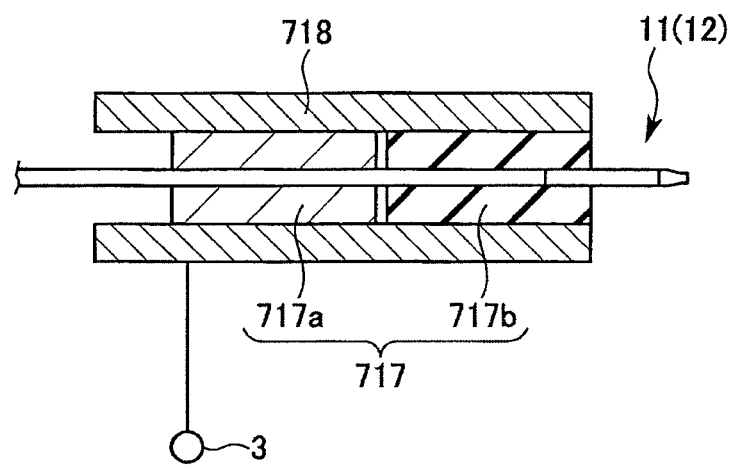
FIG. 31 is a diagram showing another example of the power-supply terminal according the sixteenth modification example.

As shown in FIG. 31, an air space may be provided between the frame conductive layer 718 and each power-supply terminal 11 or 12 in addition to the insulation layer 717 including the multiple regions 717a and 717b. Also in this case, the electrostatic capacitance of the tubular capacitor 19 can be adjusted easily similar to the configuration of FIG. 30 by adjusting a size (width) of the air space that is provided adjacent to the insulation layer 717.

In the above-described embodiment, an exemplar configuration where the negative electrode of the power source is connected to the motor yoke 3 is described. This configuration is effective to a motor rotatable in only one direction.

Figure 32:
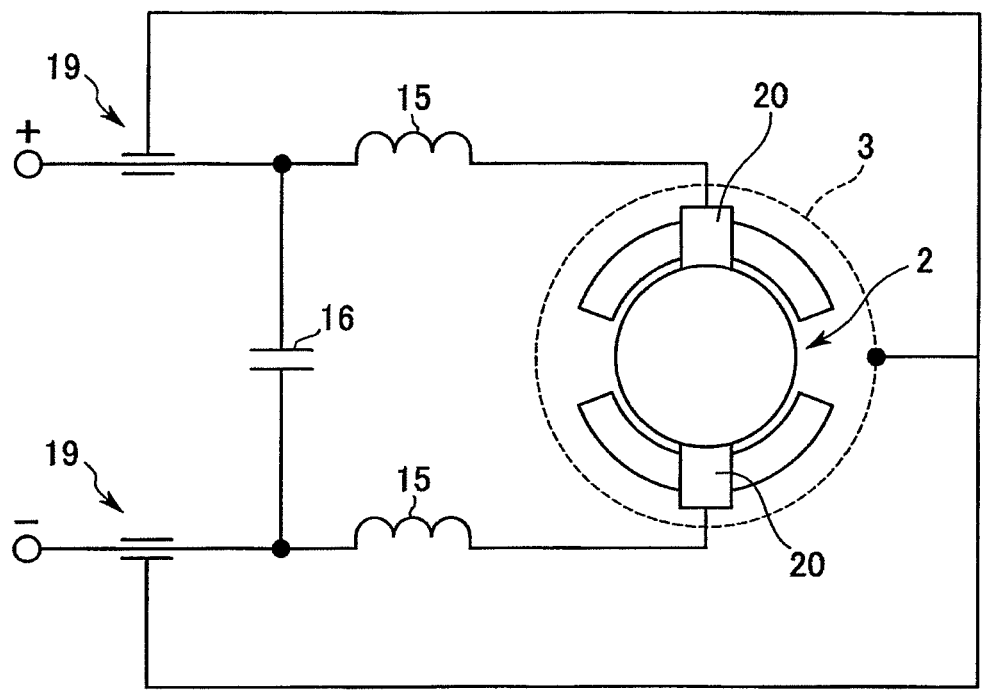
FIG. 32 is a diagram showing an electric circuit of a motor, in which a negative electrode is not grounded, according to a seventeenth modification example of the exemplar embodiment.

Since the negative electrode of the power source is grounded, voltage of the power source can be stabilized. Alternatively, as shown in FIG. 32, the negative electrode of the power source may not be connected to the motor yoke 3. FIG. 32 is a circuit diagram showing a configuration in which the negative electrode of the power source is not connected to the motor yoke 3, according to the present disclosure. FIG. 32 corresponds to FIG. 5. By the configuration of FIG. 32, the effects of the present disclosure can be obtained even in a motor rotatable in both directions.

Figure 11B:
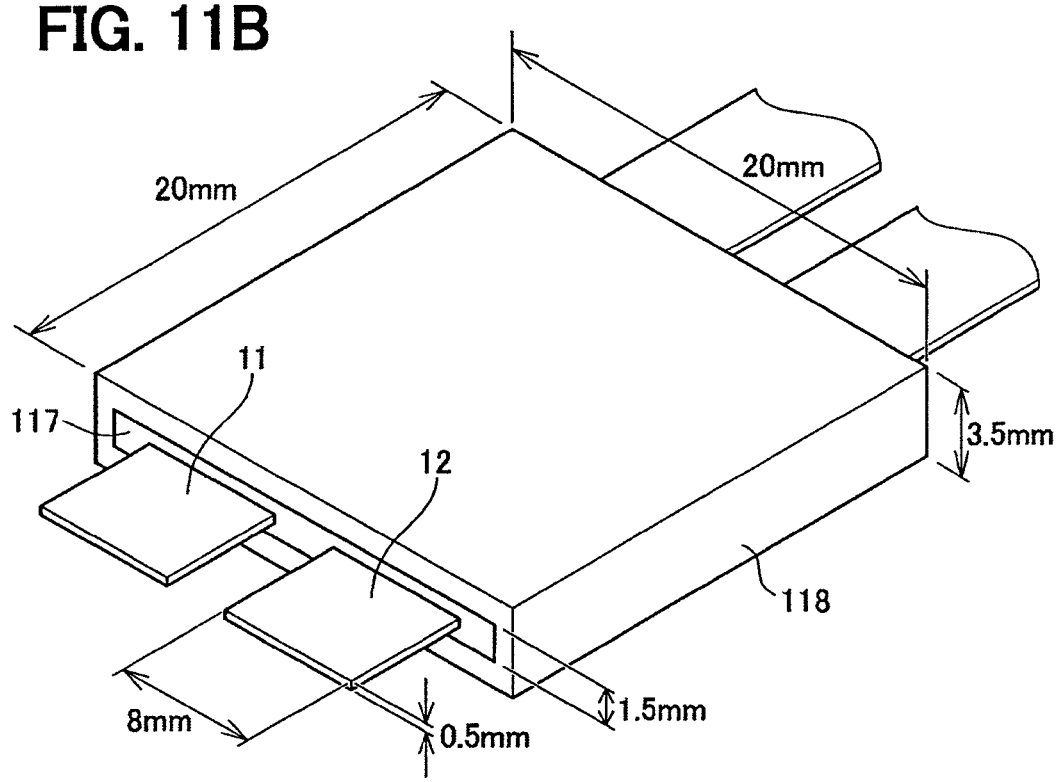
FIG. 11B is a perspective view showing the power-supply terminal according to the third modification example.
Figure 33:
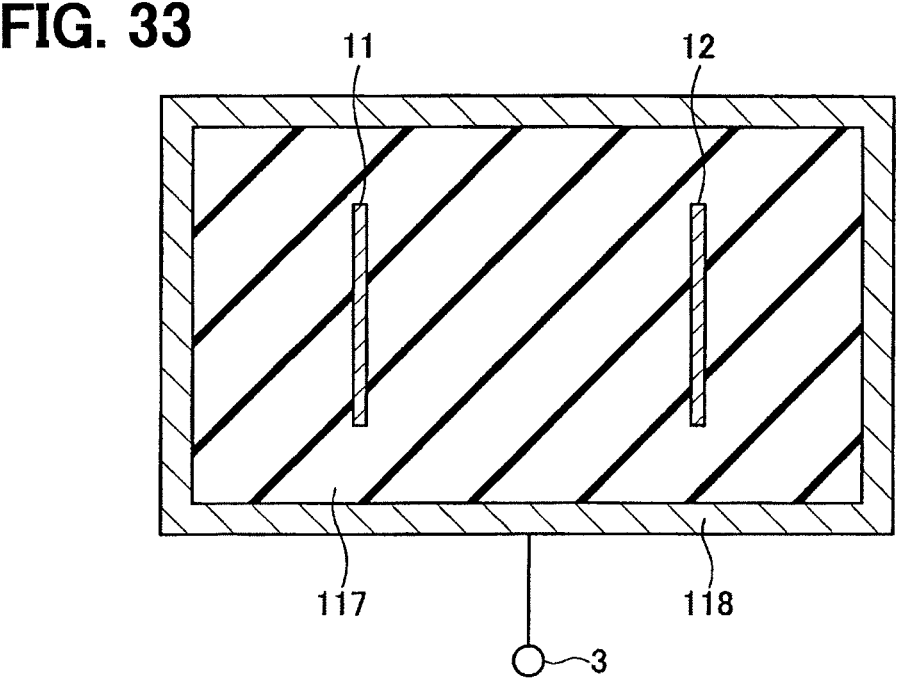
FIG. 33 is a schematic sectional diagram showing power-supply terminals according to an eighteenth modification example of the exemplar embodiment.

In the above-described embodiment, as shown in FIGS. 11A and 11B, the insulation layers 117 of the first and second power-supply terminals 11 and 12 are integrated, and the frame conductive layers 118 of the first and second power-supply terminals 11 and 12 are integrated, as an exemplar configuration of the present disclosure. In this configuration, the two power-supply terminals 11 and 12 are aligned in a straight line. Alternatively, as shown in FIG. 33, the two power-supply terminals 11 and 12 may be arranged face-to-face and parallel to each other. FIG. 33 shows a modification of arrangement of the power-supply terminals 11 and 12 and corresponds to FIG. 11. In the configuration shown in FIG. 33, the function of the capacitor 16 is provided also between the power-supply terminals 11 and 12.

Figure 34:
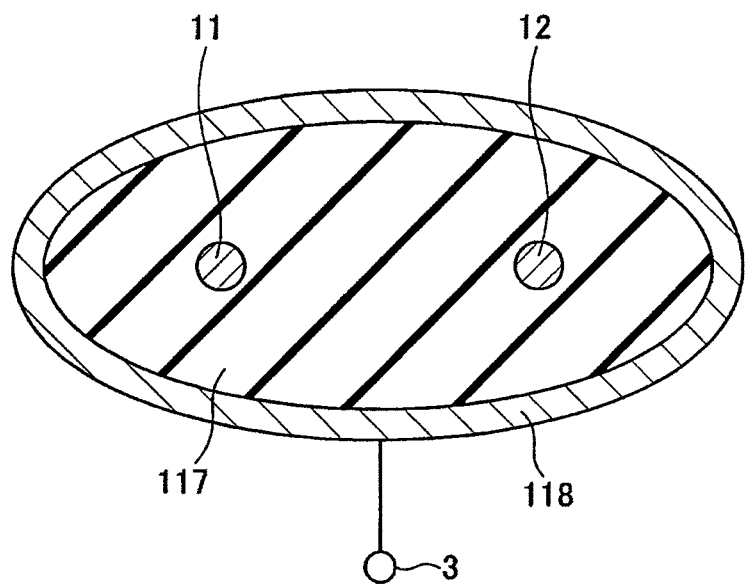
FIG. 34 is a schematic sectional diagram showing power-supply terminals according to a nineteenth modification example of the exemplar embodiment.

The shapes of the power-supply terminals 11 and 12 are not limited to flat-plate-like shapes. As shown in FIG. 34, outer peripheral surfaces of the power-supply terminals 11 and 12 may be a circular surface (curved surface). FIG. 34 is diagram showing a modification of the shapes of the power-supply terminals 11 and 12.

Figure 35:
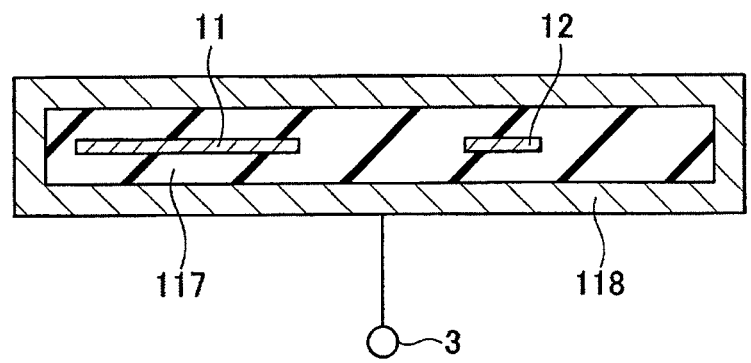
FIG. 35 is a schematic sectional diagram showing power-supply terminals according to a twentieth modification example of the exemplar embodiment.
Figure 36:
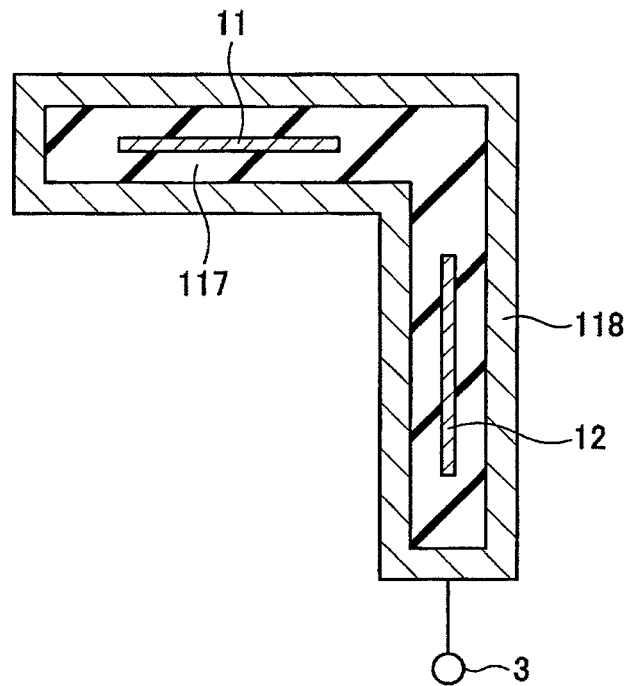
FIG. 36 is a schematic sectional diagram showing power-supply terminals according to a twenty-first modification example of the exemplar embodiment.
Figure 37:
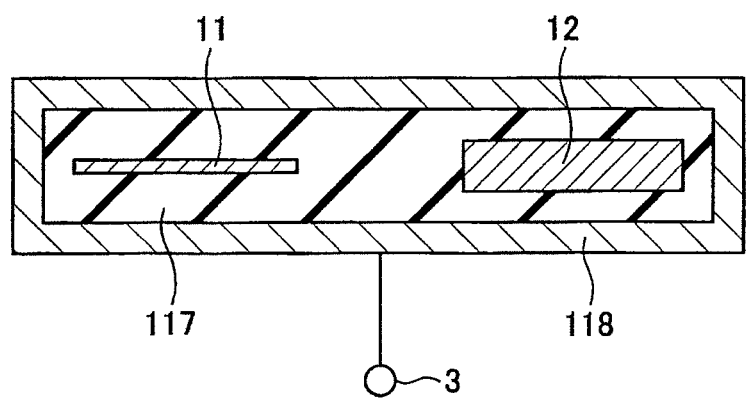
FIG. 37 is a schematic sectional diagram showing power-supply terminals according to a twenty-second modification example of the exemplar embodiment.

In the configurations shown in FIGS. 11A, 11B, 33 and 34, the two power-supply terminals 11 and 12 are the same in shape and are arranged symmetrically with respect to the insulation layer 117 and the conductive layer 118. In other words, in the configurations shown in FIGS. 11A, 11B, 33 and 34, the two power-supply terminals 11 and 12 are the same in distance from the frame conductive layer 118 and in area of surface facing to the frame conductive layer 118. Alternatively, as shown in FIGS. 35 to 37, the shapes of the two power-supply terminals 11 and 12 may be different from each other, or the arrangement of the two power-supply terminals 11 and 12 may be asymmetric. FIGS. 35 to 37 show configurations in which the shapes and arrangement of the two power-supply terminals 11 and 12 are asymmetric. More specifically, as shown in FIG. 35, the first and second power-supply terminals 11 and 12 may be different from each other in area of surface facing to the frame conductive layer 118 and in width in cross-section. As shown in FIG. 36, the first and second power-supply terminals 11 and 12 may be arranged such that extending directions in their cross-section are different from each other. For example, one of the power-supply terminals 11 or 12 may be arranged perpendicular to the other of the power-supply terminals 11 or 12. One of the power-supply terminals 11 or 12 may be arranged in a horizontal direction, and the other of the power-supply terminals 11 or 12 may be arranged in a vertical direction perpendicular to the horizontal direction. As shown in FIG. 37, the first and second power-supply terminals 11 and 12 may be different from each other in thickness such that the distance from the frame conductive layer 118 is differentiated between the first and second power-supply terminals 11 and 12.

Additional configurations are shown in FIGS. 38A to 43B, as modifications of the present disclosure. As shown in FIG. 38A, the metallic motor yoke 3 has a plate-like protrusion 3c protruding from the flange 3a outward in a radial direction of the flange 3a. As shown in FIG. 38B, the power-supply terminals 11 and 12 are mounted on the plate-like protrusion 3c. An insulation layer 817 is formed on an outer peripheral portion of each power-supply terminal 11 or 12, and the insulation layers 817 of the two power-supply terminals 11 and 12 are connected and integrated. Moreover, a fixing plate 818 is provided above the two power-supply terminals 11 and 12. The fixing plate 818 fixes the positions of the power-supply terminals 11 and 12 with covering the insulation layer 817 formed on the power-supply terminals 11 and 12. The fixing plate 818 is a metallic plate or a plate made of conductive material. In the configuration shown in FIG. 38A to 38C, the fixing plate 818 is used as the frame conductive layer. The fixing plate 818 is fixed to the above-described plate-like protrusion 3c with contacting the insulation layer 817 formed on each power-supply terminal 11 or 12. According to the above-described configuration, a component configuration in which a capacitor is constituted by the insulation layer and the frame conductive layer can be made to be thin relatively. The fixing plate 818 may be fixed to the plate-like protrusion 3c by welding as shown in FIG. 38B or by using screws as shown in FIG. 38C.

In the configuration shown in FIGS. 39A and 39B, the plate-like protrusion 3c of the metallic motor yoke 3 has a relatively wide dimension in a tangential direction of the flange 3a. The plate-like protrusion 3c is flexible and can be bent. Also in the present configuration, the power-supply terminals 11 and 12 are mounted on the plate-like protrusion 3c. The insulation layer 817 is formed on the outer peripheral portion of each power-supply terminal 11 or 12, and the insulation layers 817 of the two power-supply terminals 11 and 12 are connected and integrated. After the mounting of the power-supply terminals 11 and 12 on the plate-like protrusion 3c, both end portions of the plate-like protrusion 3c in the tangential direction are bent as shown in FIG. 39B. Accordingly, the insulation layer 817 formed on each power-supply terminal 11 or 12 is enclosed by the plate-like protrusion 3c, and the plate-like protrusion 3c functions as the frame conductive layer. In the above-described configuration, the fixing plate 818 can be omitted, and the number of components can be reduced as compared with the configuration of FIGS. 38A to 38C.

Figures 40A, 40B:
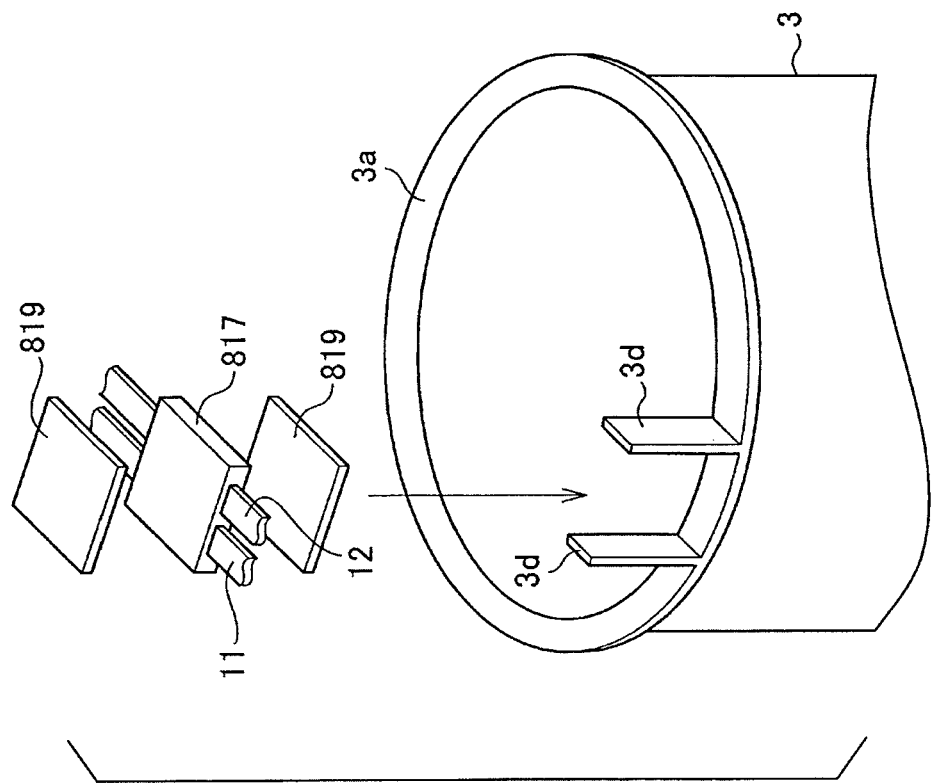
FIG. 40A is a diagram showing power-supply terminals and a motor yoke, according to a twenty-fifth modification example of the exemplar embodiment.
FIG. 40B is a diagram showing the power-supply terminals attached to the motor yoke, according to the twenty-fifth modification example.

In the configuration of FIGS. 40A and 40B, as shown in FIG. 40A, the metallic motor yoke 3 has claw-like protrusions 3d protruding from the flange 3a in a thrust direction toward the flange 4a of the end plate 4. A pair of the claw-like protrusions 3d is provided to be distant from each other by a predetermined distance. Each claw-like protrusion 3d is flexible and can be bent. The insulation layer 817, provided by integrating insulation layers formed on the respective power-supply terminals 11 and 12, and two metallic plates 819 such as iron plates are arranged between the pair of claw-like protrusions 3d. The two metallic plates 819 are used as the frame conductive layers in the configuration shown in FIGS. 40A and 40B. One of the two metallic plates 819 is located on the insulation layer 817, and the other of the two metallic plates 819 is located under the insulation layer 817. The power-supply terminals 11 and 12, the insulation layer 817 and the two metallic plates 819 are firstly positioned between the pair of claw-like protrusions 3d. Subsequently, as shown FIG. 40B, end portions of the claw-like protrusions 3d are bent into L shapes. Accordingly, the power-supply terminals 11 and 12, the insulation layer 817 and the two metallic plates 819 are held between the pair of claw-like protrusions 3d.

Figure 41A:
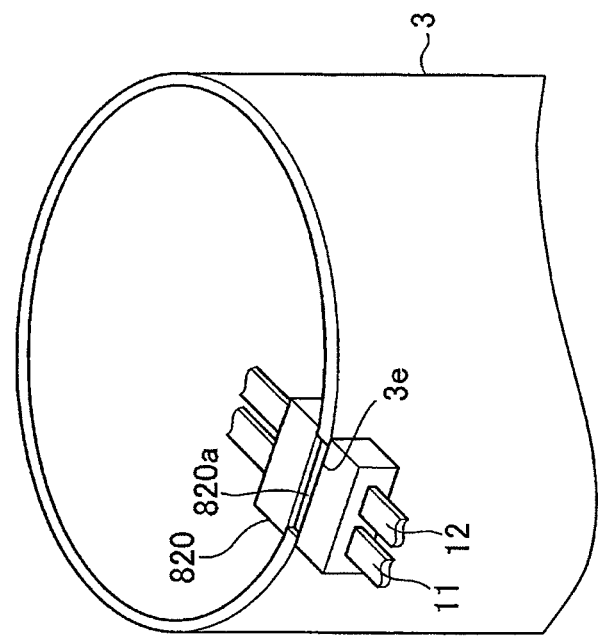
FIG. 41A is a diagram showing power-supply terminals and a motor yoke, according to a twenty-sixth modification example of the exemplar embodiment.
Figure 41B:
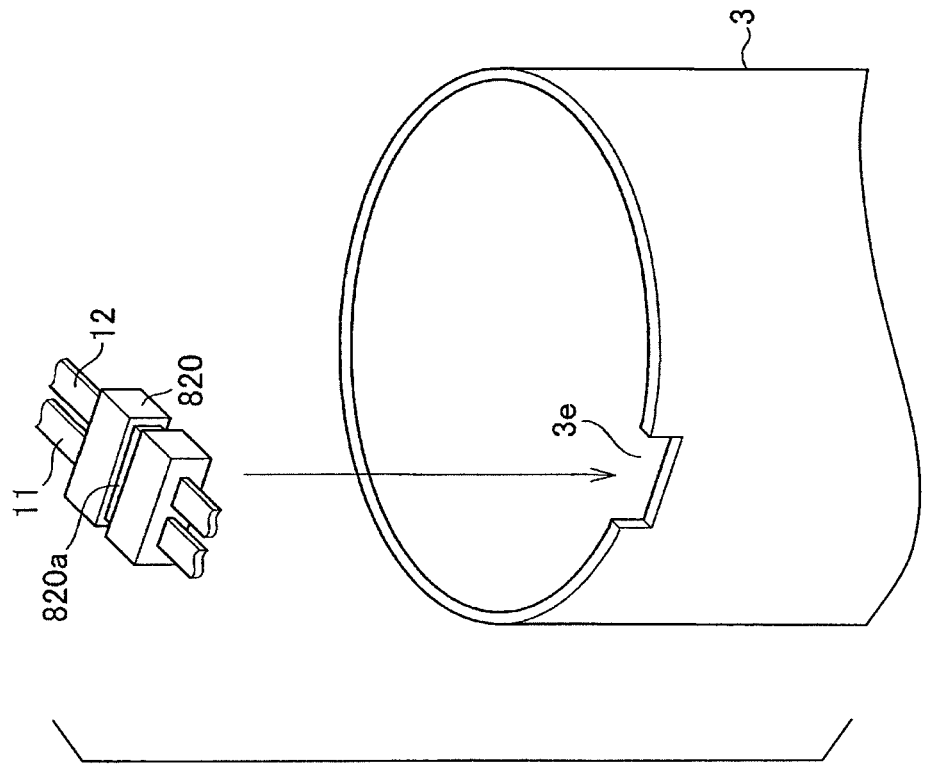
FIG. 41B is a diagram showing the power-supply terminals attached to the motor yoke, according to the twenty-sixth modification example.

In the configuration shown in FIGS. 41A and 41B, a rectangular cutout 3e is formed on one end of a side wall of the metallic motor yoke 3 as shown in FIG. 41A. The power-supply terminals 11 and 12 are connected to each other via a connection body 820 made of a resin material such as rubber or plastic. The connection body 820 is used as the insulation layer in the configuration of FIG. 41B. The connection body 820 has a rectangular parallelepiped shape and has a groove-like concave portion 820a on an outer surface of the connection body 820. The concave portion 820a is provided over an entire circumference of the connection body 820 such that the concave portion 820a has a looped shape as a whole. The connection body 820 holding the power-supply terminals 11 and 12 is inserted into the cutout 3e and attached to the motor yoke 3, as shown in FIG. 41B. More specifically, an edge portion of the motor yoke 3 which defines the cutout 3e can be fitted to the concave portion 820a. When the edge portion of the motor yoke 3 is fitted to the concave portion 820a, the connection body 820 and the power-supply terminals 11 and 12 that are connected to each other via the connection body 820 are attached to the motor yoke 3. Accordingly, the edge portion of the metallic motor yoke 3 which defines the cut out 3e is in contact with the connection body 820, and the motor yoke 3 functions as the frame conductive layer.

Figure 42A:
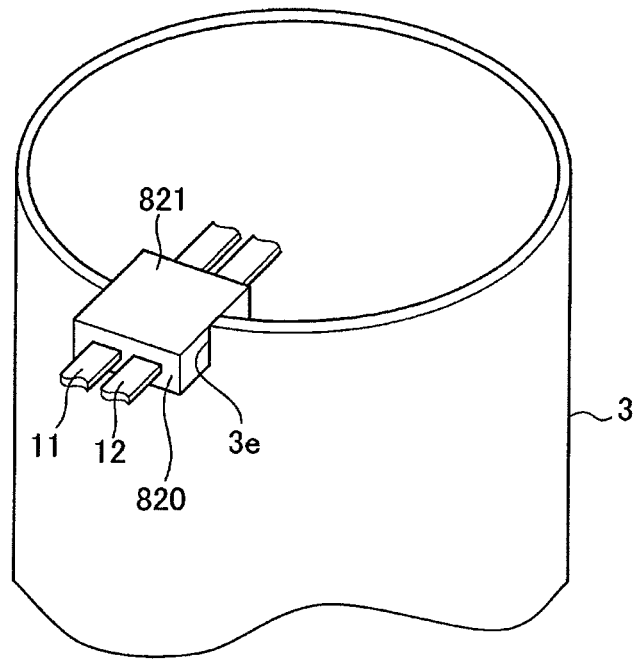
FIG. 42A is a diagram showing power-supply terminals attached to a motor yoke, according to a twenty-seventh modification example of the exemplar embodiment.
Figure 42B:
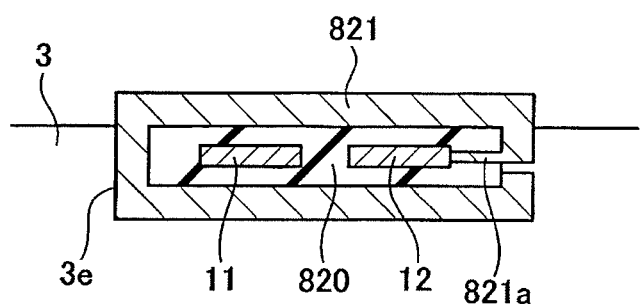
FIG. 42B is a sectional diagram showing the power-supply terminals attached to the motor yoke, according to the twenty-seventh modification example.

The configuration of FIGS. 42A and 42B is similar to the configuration of FIGS. 41A and 41B in most part, but different from the configuration of FIGS. 41A and 41B in that an outer surface of the connection body 820 is covered with a metallic plate 821. The metallic plate 821 is used as the frame conductive layer in the configuration shown in FIGS. 42A and 42B. The metallic plate 821 has a concave portion similar to the above-described concave portion 820a on an outer surface of the metallic plate 821. The edge portion of the motor yoke 3 which defines the cutout 3e is fitted to the concave portion of the metallic plate 821. Accordingly, the power-supply terminals 11 and 12, the connection body 820 and the metallic plate 821 are attached to the motor yoke 3. As shown in FIG. 42B, the metallic plate 821 has a bent portion 821a on a side of the metallic plate 821. The bent portion 821a is in contact with one of the power-supply terminals 11 or 12 with extending through the connection body 821. For example, the bent portion 821a is in contact with the second power-supply terminal 12 in FIG. 42B.

Figure 43A:
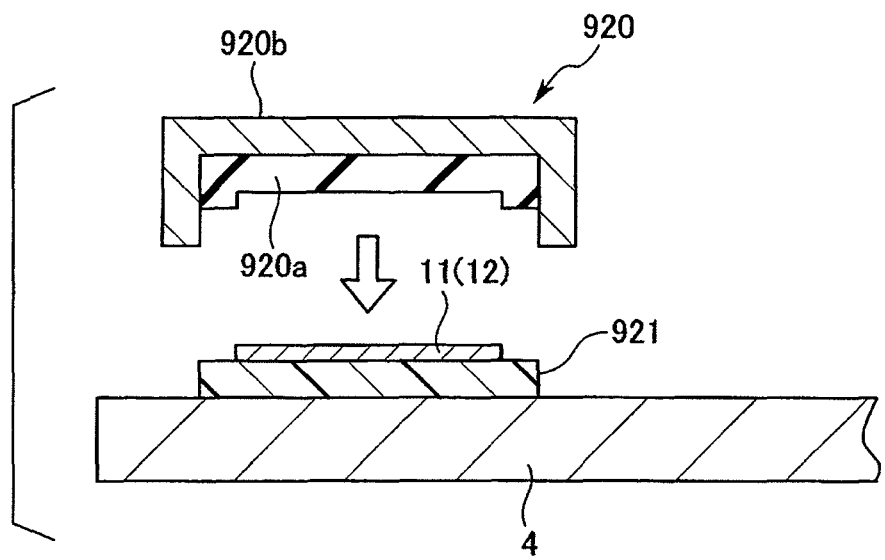
FIG. 43A is a sectional diagram showing a power-supply terminal on a brush holder and a covering member that is to be attached to an end plate with covering the brush holder, according to a twenty-eighth modification example of the exemplar embodiment.
Figure 43B:
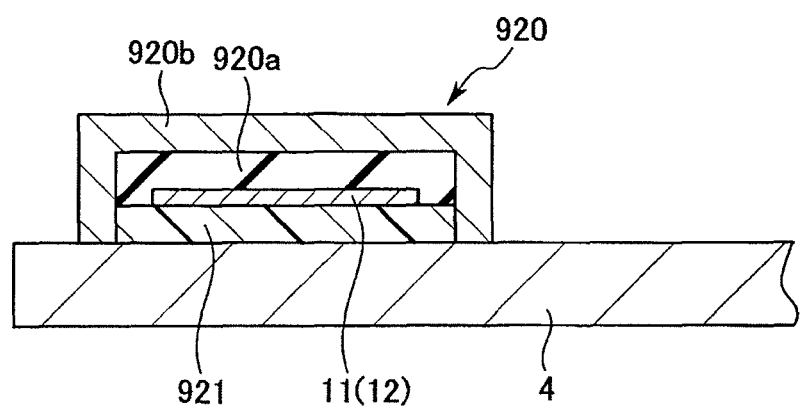
FIG. 43B is a diagram showing the power-supply terminal located between the brush holder and the covering member attached to the end plate, according to the twenty-eighth modification example.

In the configuration shown in FIGS. 43A and 43B, a brush holder 921 made of resin is disposed on the end plate 4 made of metal as shown in FIG. 43A. The power-supply terminals 11 and 12 are provided on the brush holder 921. Additionally, a covering member 920 is provided on the power-supply terminals 11 and 12 and covers the power-supply terminals 11 and 12. The covering member 920 includes an inner layer 920a used as the insulation layer, and an outer layer 920b used as the frame conductive layer. When the covering member 920 is attached to the end plate 4 as shown in FIG. 43B, the inner layer 920a contacts the brush holder 921. The inner layer 920a and the brush holder 921 are used as the insulation layer enclosing the power-supply terminals 11 and 12. The outer layer 920b is in contact with the end plate 4, and the outer layer 920b and the end plate 4 function as the frame conductive layer.

Figure 44:
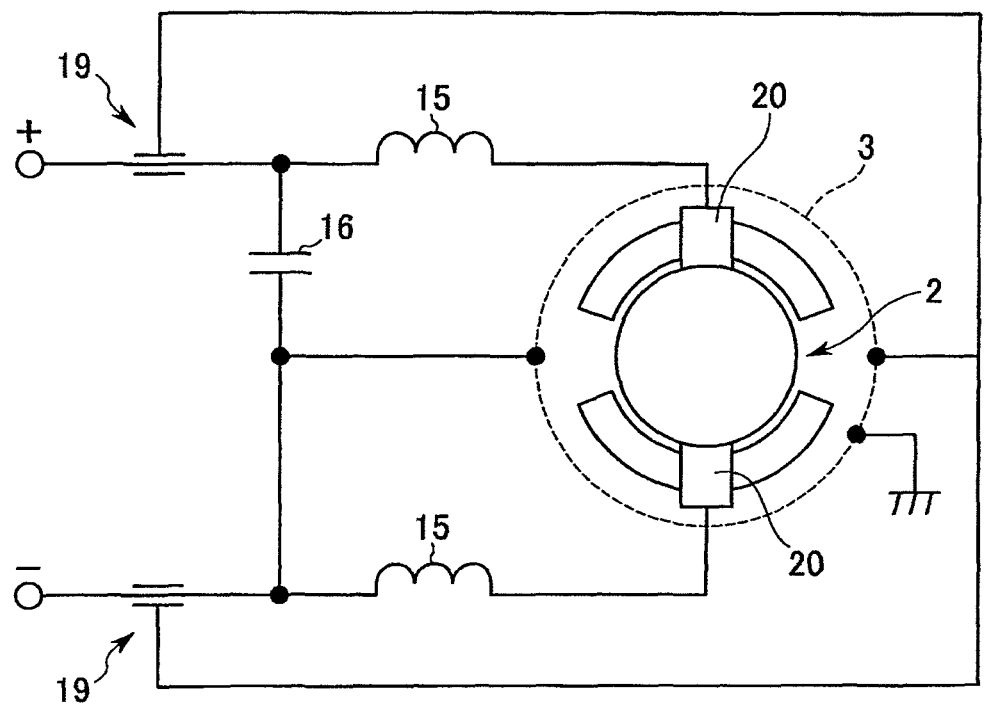
FIG. 44 is a diagram showing an electric circuit in which the motor yoke is grounded, according to a twenty-ninth modification example of the exemplar embodiment.

The motor yoke 3 may be grounded as shown in FIG. 44. In this case, the frame conductive layer is grounded via the motor yoke 3. Thus, a function of the tubular capacitor 19 can be fulfilled stably. FIG. 44 shows a modification in which the motor yoke 3 is grounded.

In the above-described embodiment, the brushed DC motor is described as an exemplar configuration of the rotating electric machine of the present disclosure. However, the application of the present disclosure is not limited to this. For example, the present disclosure can be applied to another rotating electric machine such as a brushless motor.

Additional advantages and modifications will readily occur to those skilled in the art. The disclosure in its broader terms is therefore not limited to the specific details, representative apparatus, and illustrative examples shown and described.

What is claimed is:

1. A rotating electric machine comprising:
   a rotation body driven to rotate;
   an accommodation body housing the rotation body;
   a first power-supply member electrically connected to a positive electrode of a power source;
   a second power-supply member electrically connected to a negative electrode of the power source;
   an insulation layer contacting outer peripheral surfaces of the first and second power-supply members; and
   a conductive layer contacting the insulation layer on an opposite side of the insulation layer from the outer peripheral surfaces of the first and second power-supply members, wherein
   the conductive layer is electrically connected to the accommodation body,
   each of the first and second power-supply members, the insulation layer and the conductive layer constitute a capacitor to reduce noise, and
   an electrostatic capacitance of the capacitor is larger than or equal to 5 pF.

2. The rotating electric machine according to claim 1, wherein each of the first and second power-supply members has a flat-plate shape having opposite flat surfaces, and the insulation layer is in contact with the flat surfaces of the outer peripheral surfaces of the first and second power-supply members.

3. The rotating electric machine according to claim 2, wherein
   both the insulation layer and the conductive layer are provided along the outer peripheral surface of each of the first and second power-supply members, and
   at least one of the insulation layer or the conductive layer is discontinuous in a circumferential direction of the outer peripheral surface of each of the first and second power-supply members.

4. The rotating electric machine according to claim 1, wherein
   each of the first and second power-supply members has an extending body, the extending body includes:
      a first extending portion extending along an outer wall surface of the accommodation body;
      a bent portion located at an end of the first extending portion; and
      a second extending portion extending from the bent portion in a direction away from the accommodation body, and
   the insulation layer and the conductive layer cover at least the bent portion of the extending body.

5. The rotating electric machine according to claim 1, wherein
   the first power-supply member and the second power-supply member are arranged adjacent to each other,
   a part of the insulation layer which contacts the outer peripheral surface of the first power-supply member is connected to and integrated with a part of the insulation layer which contacts the outer peripheral surface of the second power-supply member, and
   a part of the conductive layer which contacts the insulation layer opposite the outer peripheral surface of the first power-supply member is connected to and integrated with a part of the conductive layer which contacts the insulation layer opposite the outer peripheral surface of the second power-supply member.

6. The rotating electric machine according to claim 1 being adopted as a motor, the motor including a commutator attached to a rotor that is the rotation body, a brush slidably contacting the commutator, and a brush holder holding the brush and made of insulation resin, wherein
   the brush receives electricity from the power source through the first and second power-supply members, and
   the insulation layer is a part of the brush holder.

7. The rotating electric machine according to claim 6, wherein
   the conductive layer is integrated with the brush holder and embedded in the brush holder,
   the first and second power-supply members extend through the brush holder, and
   the part of the brush holder that is the insulation layer is interposed between each of the first and second power-supply members and the conductive layer inside the brush holder.

8. The rotating electric machine according to claim 1, wherein
   the accommodation body includes a yoke having an opening at one end of the yoke,
   and a lid body closing the opening of the yoke,
   the yoke is made of a conductive material, and
   at least a part of the conductive layer is a part of the yoke.

9. The rotating electric machine according to claim 8, wherein
   a part of the conductive layer is a part of the yoke made of a conductive material, and
   the other part of the conductive layer is a part of the lid body made of a conductive material.

10. The rotating electric machine according to claim 1, wherein
    the accommodation body includes a yoke having an opening at one end of the yoke, and a lid body closing the opening of the yoke,
    the lid body is made of a conductive material, and
    at least a part of the conductive layer is a part of the lid body.

11. The rotating electric machine according to claim 1 being adopted as a motor and further comprising a motor holding member made of metal, wherein
    the motor holding member attached to the accommodation body and fixed at a predetermine position to keep an attachment state of the motor, and
    the conductive layer is a part of the motor holding member.

12. The rotating electric machine according to claim 1, wherein
    at least one of the first or second power-supply member includes a power-supply member body and an enclosing portion that encloses the power-supply member body,
    the insulation layer includes a first insulation layer inside the enclosing portion and a second insulation layer outside the enclosing portion,
    the power-supply member body has electric conductivity and is in contact with the first insulation layer inside the enclosing portion,
    the enclosing portion has electric conductivity and is in contact with the second insulation layer opposite the power-supply member body,
    the conductive layer includes a first conductive layer contacting the first insulation layer opposite the power-supply member body, and a second conductive layer connected to the first conductive layer and contacting the second insulation layer opposite the enclosing portion, and
    the second conductive layer is electrically connected to the accommodation body.

13. The rotating electric machine according to claim 1, further comprising a laminated body that includes:
    an insertion hole into which each of the first and second power-supply members is inserted;
    the insulation layer enclosing the insertion hole; and
    the conductive layer enclosing the insulation layer outside the insulation layer,
    wherein the laminated body is attached to each of the first and second power-supply members due to the insertion of the first and second power-supply members into the insertion hole.

14. The rotating electric machine according to claim 1, wherein
    the insulation layer and the conductive layer are in contact with each other,
    one of the insulation layer or the conductive layer is movable relative to the other of the insulation layer or the conductive layer, and
    a position of the one of the insulation layer or the conductive layer is switched by the relative motion between a position, where only the insulation layer exists between the conductive layer and each of the first and second power-supply members, and a position, where an air space exists in addition to the insulation layer between the conductive layer and each of the first and second power-supply members.

15. The rotating electric machine according to claim 1, wherein
    the insulation layer includes multiple regions different from each other in relative permittivity, and
    the multiple regions of the insulation layer are arranged adjacent to each other along the conductive layer between the conductive layer and each of the first and second power-supply members.

16. The rotating electric machine according to claim 1, wherein the electrostatic capacitance of the capacitor is greater than or equal to 10 pF.

17. The rotating electric machine according to claim 1, wherein the electrostatic capacitance of the capacitor is equal to 30 pF.

* * * * *